United States Patent
Omi et al.

(10) Patent No.: US 8,180,133 B2
(45) Date of Patent: May 15, 2012

(54) IMAGE PROCESSING METHOD AND IMAGE PROCESSING APPARATUS, AND PROGRAM

(75) Inventors: Yasuo Omi, Tokyo (JP); Hasnine Akter Haque, Tokyo (JP)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 901 days.

(21) Appl. No.: 12/238,951

(22) Filed: Sep. 26, 2008

(65) Prior Publication Data

US 2009/0087060 A1    Apr. 2, 2009

(30) Foreign Application Priority Data

Sep. 28, 2007 (JP) ................... 2007-253898

(51) Int. Cl.
*G06K 9/00* (2006.01)
*A61B 6/00* (2006.01)
(52) U.S. Cl. ............ 382/131; 382/130; 378/4; 378/98.9
(58) Field of Classification Search .................. 382/130, 382/131; 378/4, 5, 98.11, 98.12
See application file for complete search history.

(56) References Cited

U.S. PATENT DOCUMENTS

| | | | | |
|---|---|---|---|---|
| 5,068,788 A | * | 11/1991 | Goodenough et al. | 382/131 |
| 5,590,165 A | * | 12/1996 | Gohno et al. | 378/18 |
| 6,035,056 A | * | 3/2000 | Karssemeijer | 382/132 |
| 6,198,797 B1 | | 3/2001 | Majima et al. | |
| 6,839,456 B2 | * | 1/2005 | Touzawa et al. | 382/128 |
| 6,909,771 B2 | * | 6/2005 | Waggener et al. | 378/54 |
| 7,054,406 B2 | | 5/2006 | Ikeda et al. | |
| 7,239,730 B2 | * | 7/2007 | Londt et al. | 382/128 |
| 7,252,638 B2 | | 8/2007 | Kahn et al. | |
| 7,298,879 B2 | * | 11/2007 | Wiemker | 382/128 |
| 7,359,541 B2 | * | 4/2008 | Kawano | 382/132 |

(Continued)

FOREIGN PATENT DOCUMENTS

JP     2001029343 A  *  2/2001

(Continued)

OTHER PUBLICATIONS

Zhao, Binsheng et al., "Automated Quantification of Body Fat Distribution on Volumetric Computed Tomography," Journal of Computer Assisted Tomography, 2006, vol. 30, Issue 5, pp. 777-783.

*Primary Examiner* — Alexander H Taningco
(74) *Attorney, Agent, or Firm* — Armstrong Teasdale LLP

(57) ABSTRACT

An image processing method includes identifying a body region in a tomographic image based on pixel values within the tomographic image, extracting a bone muscle region corresponding to essential parts of bones and muscles based on bone muscle pixels having pixel values corresponding to the bones or muscles in the body region, searching boundary points of the bone muscle region from outside a region surrounding the extracted bone muscle region to inside the region, creating a bone-muscle region outer peripheral profile line by joining only boundary points at which each index related to at least one of a length and a slope of a line segment connecting between the adjoining boundary points of the searched boundary points satisfies a predetermined condition, and extracting a visceral fat region comprised of fat pixels having pixel values corresponding to fat in a region lying inside the bone-muscle region outer peripheral profile line.

20 Claims, 19 Drawing Sheets

U.S. PATENT DOCUMENTS

| | | | |
|---|---|---|---|
| 7,519,209 B2 * | 4/2009 | Dawant et al. | 382/128 |
| 7,623,702 B2 * | 11/2009 | Arata et al. | 382/154 |
| 7,720,270 B2 * | 5/2010 | Li et al. | 382/131 |
| 7,916,912 B2 * | 3/2011 | Abramov et al. | 382/128 |
| 2006/0074288 A1 | 4/2006 | Kelly et al. | |
| 2006/0204063 A1 * | 9/2006 | Nakashima et al. | 382/128 |
| 2007/0053485 A1 | 3/2007 | Kobayashi | |
| 2008/0130975 A1 | 6/2008 | Hara et al. | |

FOREIGN PATENT DOCUMENTS

| | | | |
|---|---|---|---|
| JP | 2002-222410 | | 8/2002 |
| JP | 2003061949 A | * | 3/2003 |
| JP | 2003-339694 | | 12/2003 |
| JP | 2004-057275 | | 2/2004 |
| JP | 2004057275 A | * | 2/2004 |

* cited by examiner

IMAGE PROCESSING METHOD AND IMAGE PROCESSING APPARATUS, AND PROGRAM

CROSS REFERENCE TO RELATED APPLICATIONS

This application claims the benefit of Japanese Patent Application No. 2007-253898 filed Sep. 28, 2007, which is hereby incorporated by reference in its entirety.

BACKGROUND OF THE INVENTION

The subject matter disclosed herein relates to an image processing method and an image processing apparatus both of which extract a fat region from a tomographic image of a subject, and a program used therefore.

A threshold process of pixel values is performed on tomographic images such as a CT (Computed Tomography) image, an MRI (Magnetic Resonance Imaging) image, etc., thereby making it possible to extract each fat region. A decision as to whether a metabolic syndrome is suspected, is made with a visceral fat area as one index clinically. Since, however, full fat regions are extracted simply by performing the threshold process of the pixel values, there is a need to separate a full fat region into a visceral fat region and a subcutaneous fat region.

An operator has heretofore separated a visceral fat region and a subcutaneous fat region from each other by tracing a fat region and a region containing subcutaneous fat on a tomographic image displayed on a display screen by using a pointing device such as a mouse or the like. Since, however, this method increases the burden on the operator, a method capable of separating the visceral fat region and the subcutaneous fat region from each other simpler has been expected.

Thus, several proposals have been made up to now to meet the above expectation.

There has been proposed, for example, a method for tracing a contour or profile along the outer periphery of a body surface of a subject at a tomographic image to extract a body surface region-of-interest, extracting each muscular layer of abdominal wall by a threshold process of pixel values at the body surface region-of-interest, rolling a small circle so as to cause it to contact the outer periphery of the muscular layer of abdominal wall to trace its contour or profile line, thereby extracting a visceral region-of-interest containing visceral fat, and extracting a visceral fat region from the visceral region-of-interest (refer to Japanese Unexamined Patent Publication No. 2002-222410).

There has also been proposed, for example, a method for separating a subject portion at a tomographic image into a fat pixel region and a muscle pixel region by a threshold process of pixel values, removing a skin layer, thereafter expanding each muscle pixel in such a manner that the muscle pixel region indicative of peritoneum perfectly surrounds the fat pixel region corresponding to visceral fat, setting each fat pixel adjacent to a subject's external region and a component coupled thereto as a subcutaneous fat region, further expanding the subcutaneous fat region inside by expansion of the muscle pixel, and recognizing the fat pixel region other than the post-expansion subcutaneous fat region as visceral fat (refer to Japanese Unexamined Patent Publication No. 2003-339694).

According to the method proposed by the '410 publication, however, the size of a gap or clearance in the extracted abdominal-wall muscular layer varies depending on subjects. Therefore, there is a need to suitably adjust the diameter of a small circle in order to trace the profile or contour of each abdominal-wall muscular layer suitably. Since the small circle is rolled while being shifted little by little along the profile of the abdominal-wall muscular layer and its profile line is traced, the amount of calculation increases and time is spent in processing.

According to the method proposed by the '694 publication, each muscle pixel indicative of peritoneum is temporarily expanded and a fat portion eroded by the expansion is made up. Therefore, the subcutaneous fat region is expanded inside by its expansion, whereby there is a possibility of lacking in correctness in the boundary separation between the visceral fat and the subcutaneous fat.

BRIEF DESCRIPTION OF THE INVENTION

It is desirable that the problems described previously are solved.

In a first aspect, the invention provides an image processing method including the steps of: identifying a body region of a subject in a tomographic image, based on pixel values of pixels which constitute the tomographic image; extracting a bone muscle region corresponding to essential parts of bones and muscles, based on bone muscle pixels having pixel values corresponding to the bones or muscles in the body region; searching boundary points of the bone muscle region from outside a region surrounding the extracted bone muscle region to inside the region and joining only boundary points at which each index related to at least one of a length and a slope of a line segment connecting between the adjoining boundary points of the searched boundary points satisfies a predetermined condition, thereby creating a bone-muscle region outer peripheral profile line; and extracting a region constituted of fat pixels having pixel values corresponding to fat, in a region lying inside the bone-muscle region outer peripheral profile line as a visceral fat region.

In a second aspect, the invention provides the image processing method according to the first aspect, wherein in the step of creating the bone-muscle region outer peripheral profile line, individual boundary points are sequentially set to noted boundary points, and when each of the noted boundary points is located near the front of the subject from the gravity center of the body region, only the noted boundary point at which a ratio between a distance from the gravity center thereof to a boundary point adjacent to the noted boundary point and a distance from the gravity center thereof to the noted boundary point falls within a predetermined first range, is left, whereas when each of the noted boundary points is located near the back side of the subject from the gravity center thereof, only the noted boundary point at which a distance between the noted boundary point and a boundary point adjacent thereto falls within a predetermined second range, is left, and all remaining boundary points are joined together.

In a third aspect, the invention provides an image processing apparatus including: a body region identifying device for identifying a body region of a subject in a tomographic image, based on pixel values of pixels that constitute the tomographic image; a bone-muscle region extracting device for extracting a bone muscle region corresponding to essential parts of bones and muscles, based on bone muscle pixels having pixel values corresponding to the bones or muscles in the body region; a bone-muscle region outer peripheral profile line creating device for searching boundary points of the bone muscle region from outside a region surrounding the extracted bone muscle region to inside the region and joining only boundary points at which each index related to at least one of a length and a slope of a line segment connecting between the adjoining boundary points of the searched boundary points satisfies a predetermined condition, thereby creating a bone-muscle region outer peripheral profile line; and a visceral fat region extracting device for extracting a region constituted of fat pixels having pixel values corresponding to fat, in a region lying inside the bone-muscle region outer peripheral profile line as a visceral fat region.

In a fourth aspect, the invention provides the image processing apparatus according to the third aspect, wherein the bone-muscle region outer peripheral profile line creating device sets individual boundary points to noted boundary points sequentially and leaves only each noted boundary point at which a ratio between a distance from the gravity center of the body region to a boundary point adjacent to the noted boundary point and a distance from the gravity center thereof to the noted boundary point falls within a predetermined range, and joins the remaining boundary points together.

In a fifth aspect, the invention provides the image processing apparatus according to the third aspect, wherein the bone-muscle region outer peripheral profile line creating device sets individual boundary points to noted boundary points sequentially and leaves only each noted boundary point at which a distance between the noted boundary point and a boundary point adjacent thereto falls within a predetermined range, and joins the remaining boundary points together.

In a sixth aspect, the invention provides the image processing apparatus according to the third aspect, wherein the bone-muscle region outer peripheral profile line creating device sets individual boundary points to noted boundary points sequentially, and wherein when each of the noted boundary points is located near the front of the subject from the gravity center of the body region, the bone-muscle region outer peripheral profile line creating device leaves only the noted boundary point at which a ratio between a distance from the gravity center thereof to a boundary point adjacent to the noted boundary point and a distance from the gravity center thereof to the noted boundary point falls within a predetermined first range, and when each of the noted boundary points is located near the back side of the subject from the gravity center thereof, the bone-muscle region outer peripheral profile line creating device leaves only the noted boundary point at which a distance between the noted boundary point and a boundary point adjacent thereto falls within a predetermined second range, and joins all remaining boundary points together.

In a seventh aspect, the invention provides the image processing apparatus according to the sixth aspect, wherein the first range ranges from greater than or equal to 0.8 to less than or equal to 1.2.

In an eighth aspect, the invention provides the image processing apparatus according to the sixth aspect, wherein the second range is a range equivalent to less than or equal to any length of 2% to 10% of an average inside diameter of an ellipse at the time that the body region is made approximate to the ellipse, or an average of a minor-axis diameter of the ellipse and a major-axis diameter thereof.

In a ninth aspect, the invention provides the image processing apparatus according to any one of the third through eighth aspects, further including: a full fat region extracting device for extracting a region obtained by subtracting the bone muscle region from the region constituted of the fat pixels in the body region or the body region, as a full fat region, and subcutaneous fat region extracting device for extracting a region obtained by subtracting the visceral fat region from the full fat region as a subcutaneous fat region.

In a tenth aspect, the invention provides the image processing apparatus according to any one of the third through ninth aspects, wherein the bone-muscle region extracting device performs contracting processing and expanding processing on each candidate region constituted of the bone muscle pixels in the body region sequentially to extract a bone muscle region.

In an eleventh aspect, the invention provides the image processing apparatus according to any one of the third through tenth aspects, wherein the contracting processing is an erosion process and the expanding processing is a dilation process.

In a twelfth aspect, the invention provides the image processing apparatus according to any one of the third through eleventh aspects, further including a threshold setting device for creating a histogram of pixel values of the tomographic image and setting a fat threshold range indicative of a threshold range of pixel values corresponding to fat, and a bone-muscle threshold range indicative of a threshold range of pixel values corresponding to bones or muscles, based on the histogram, wherein the bone-muscle region extracting device extracts the bone muscle region, based on the bone-muscle threshold range, and wherein the visceral fat region extracting device extracts the visceral fat region, based on the fat threshold range.

In a thirteenth aspect, the invention provides the image processing apparatus according to the twelfth aspect, wherein the threshold setting device sets the fat threshold range to $P \pm n\Delta$ assuming that a peak value of a mountain corresponding to the fat in the histogram is P and a full width half maximum of the mountain is $\Delta$, and sets the bone-muscle threshold range to a predetermined range in which the neighborhood of $P+n\Delta$ (where n: arbitrary constant) is brought to a lower limit value.

In a fourteenth aspect, the invention provides the image processing apparatus according to any one of the third through thirteenth aspects, wherein the bone-muscle region outer peripheral profile line creating device searches the boundary points along a plurality of straight lines extending radially in all directions.

In a fifteenth aspect, the invention provides the image processing apparatus according to the fourteenth aspect, wherein the straight lines are straight lines that pass through any one of the gravity center of the body region, the center of a quadrangle circumscribed around the body region, the gravity center of the bone muscle region and the center of a quadrangle circumscribed around the bone muscle region.

In a sixteenth aspect, the invention provides the image processing apparatus according to the fourteenth or fifteenth aspect, wherein the straight lines are straight lines provided in increments of a predetermined angle ranging from greater than or equal to 1° to less than or equal to 5°.

In a seventeenth aspect, the invention provides the image processing apparatus according to any one of the third through thirteenth aspects, wherein the bone-muscle region outer peripheral profile line creating device searches the boundary points along a plurality of straight lines respectively extending in parallel in forward and backward directions of the subject and in a horizontal direction thereof.

In an eighteenth aspect, the invention provides the image processing apparatus according to any one of the third through seventeenth aspects, wherein the tomographic image is a CT image or an MRI image.

In a nineteenth aspect, the invention provides a program for causing a computer to function as: a body region identifying device for identifying a body region of a subject in a tomographic image, based on pixel values of pixels that constitute the tomographic image; a bone-muscle region extracting device for extracting a bone muscle region corresponding to essential parts of bones and muscles, based on bone muscle pixels having pixel values corresponding to the bones or muscles in the body region; a bone-muscle region outer peripheral profile line creating device for searching boundary points of the bone muscle region from outside a region surrounding the extracted bone muscle region to inside the region and joining only boundary points at which each index related to at least one of a length and a slope of a line segment connecting between the adjoining boundary points of the searched boundary points satisfies a predetermined condition, thereby creating a bone-muscle region outer peripheral profile line; and a visceral fat region extracting device for extracting a region constituted of fat pixels having pixel values corresponding to fat, in a region lying inside the bone-muscle region outer peripheral profile line as a visceral fat region.

In a twentieth aspect, the invention provides the program according to the nineteenth aspect, wherein the bone-muscle region outer peripheral profile line creating device sets individual boundary points to noted boundary points sequentially, and wherein when each of the noted boundary points is located near the front of the subject from the gravity center of the body region, the bone-muscle region outer peripheral profile line creating device leaves only the noted boundary point at which a ratio between a distance from the gravity center thereof to a boundary point adjacent to the noted boundary point and a distance from the gravity center thereof to the noted boundary point falls within a predetermined first range, and when each of the noted boundary points is located near the back side of the subject from the gravity center thereof the bone-muscle region outer peripheral profile line creating device leaves only the noted boundary point at which a distance between the noted boundary point and a boundary point adjacent thereto falls within a predetermined second range, and joins all remaining boundary points together.

According to the invention, a bone muscle region constituted of bone muscle pixels having pixel values corresponding to bones or muscles, of a body region of a subject at a tomographic image is extracted. Boundary points of the bone muscle region are searched from outside to inside. Of the searched boundary points, only boundary points at which each index related to at least one of the length and slope of each line segment connecting between the adjoining boundary points meets or satisfies a predetermined condition, are joined together to create a bone-muscle region outer peripheral profile line. A visceral fat region constituted of fat pixels having pixel values corresponding to fat at a region lying inside the bone-muscle region outer peripheral profile line is extracted. Therefore, a profile or contour of a region considered to contain only the visceral fat region as a fat region can be determined by detecting only boundary points having a high possibility that they will be disposed on the profile, by a relatively simple process and joining these together. A subject's visceral fat region at the tomographic image can be separated and extracted from a subcutaneous fat region in a short period of time and more accurately.

Further objects and advantages of the present invention will be apparent from the following description of the preferred embodiments of the invention as illustrated in the accompanying drawings.

DETAILED DESCRIPTION OF THE INVENTION

An embodiment of the invention will be explained below with reference to the accompanying drawings.

Figure 1:
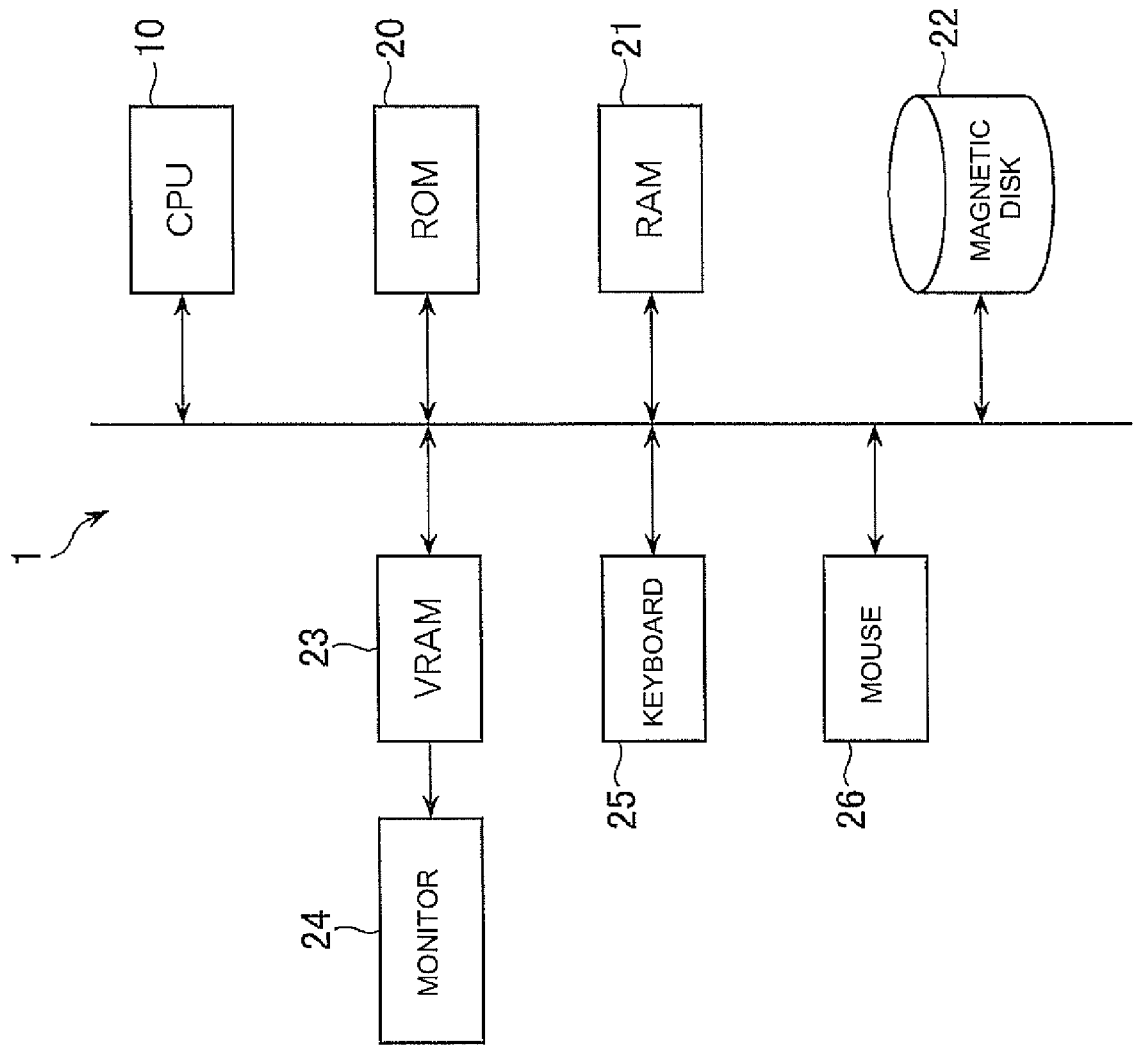
FIG. 1 is a block diagram showing an overall configuration of a tomographic image processing apparatus illustrative of one embodiment of the invention.

FIG. 1 is a block diagram showing an overall configuration of a tomographic image processing apparatus (an image processing apparatus) 1 illustrative of one embodiment of the invention. The tomographic image processing apparatus 1 separates and extracts a visceral fat region of a subject and a subcutaneous fat region thereof from a tomographic image of the subject, which is obtained by modality of an X-ray CT apparatus, an MRI apparatus, an ultrasonic apparatus or the like.

As shown in the drawing, the tomographic image processing apparatus 1 includes a central processing unit (CPU) 10 which takes charge of control on the entire apparatus, a ROM (Read Only Memory) 20 which stores a boot program and the like therein, a RAM (Random Access Memory) 21 which functions as a main storage device, an OS (Operating Software), a magnetic disk 22 which stores an image processing program, tomographic image data and the like therein, a VRAM (Video RAM) 23 corresponding to a memory which expands image data to be displayed, a monitor 24 which displays an image, based on the image data expanded on the VRAM 23, and a keyboard 25 and a mouse 26 for performing various settings.

Incidentally, the tomographic image data may be acquired from the outside of the tomographic image processing apparatus 1. For example, data may be read and acquired from an image server connected to the tomographic image processing apparatus 1 via a network. Alternatively, data stored in a media may be read and acquired from a media reading device or reader connected to the tomographic image processing apparatus 1.

Figure 2:
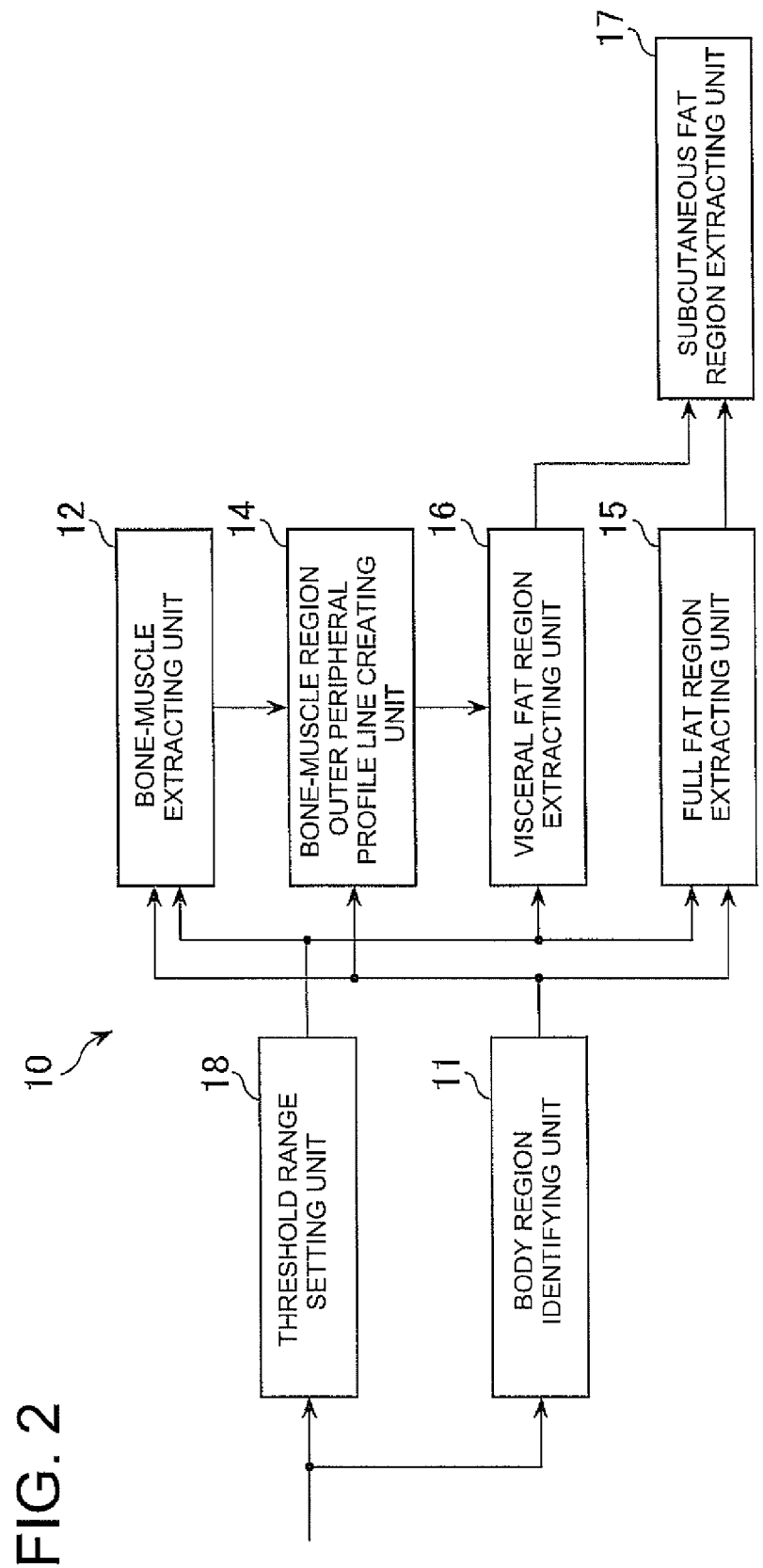
FIG. 2 is a diagram illustrating a configuration of a central processing unit (CPU).

FIG. 2 is a block diagram showing the configuration of the CPU 10. As shown in the drawing, the CPU 10 includes a body region specifying or identifying unit (a body region identifying device) 11, a bone-muscle region extracting unit (a bone-muscle region extracting device) 12, a bone-muscle region outer peripheral profile line creating unit (a bone-muscle region outer peripheral profile line creating device) 14, a full fat region extracting unit (a full fat region extracting device) 15, a visceral fat region extracting unit (a visceral fat region extracting device) 16, a subcutaneous fat region extracting unit (a subcutaneous fat region extracting device) 17, and a threshold rage setting unit (a threshold range setting device) 18. In practice, the CPU 10 functions as these respective parts by reading the image processing program stored in the magnetic disk 22 and executing it.

The body region identifying unit 11 identifies or specifies a body region of a subject in a tomographic image, based on the values of pixels that constitute the tomographic image.

The bone-muscle region extracting unit 12 extracts a bone muscle region equivalent to essential parts of bones and muscles, based on bone-muscle pixels having pixel values corresponding to the bone or muscle in the subject's body region identified by the body region identifying unit 11.

The bone-muscle region outer peripheral profile line creating unit 14 searches boundary points of the bone muscle region along a plurality of directions headed from outside a region or area that surrounds the bone muscle region extracted by the bone-muscle region extracting unit 12 to inside the region, and joins together only boundary points at which an index related to at least one of the length and slope of a line segment that connects between the adjoining boundary points of the searched boundary points meets a predetermined condition thereby to create a bone-muscle region outer peripheral profile line.

The visceral fat region extracting unit 15 extracts, as a visceral fat region, a region or area constituted by fat pixels having pixel values corresponding to fat in a region lying inside the bone-muscle region outer peripheral profile line created by the bone-muscle region outer peripheral profile line creating unit 14.

The full fat region extracting unit 16 extracts as a full fat region, a region or area constituted by fat pixels in the body region specified by the body region identifying unit 11.

The subcutaneous fat region extracting unit 17 extracts, as a subcutaneous fat region, a region or area obtained by subtracting the visceral fat region extracted by the visceral fat region extracting unit 15 from the full fat region extracted by the full fat region extracting unit 16.

The threshold setting unit 18 creates a histogram of pixel values with respect to an original image of a tomographic image and sets a fat threshold range indicative of a threshold range of each pixel value corresponding to fat, and a bone-muscle threshold range indicative of a threshold range of each pixel value corresponding to each bone or muscle.

Thus, a flow of processing at the tomographic image processing apparatus 1 according to the present embodiment will be explained.

Figure 3:
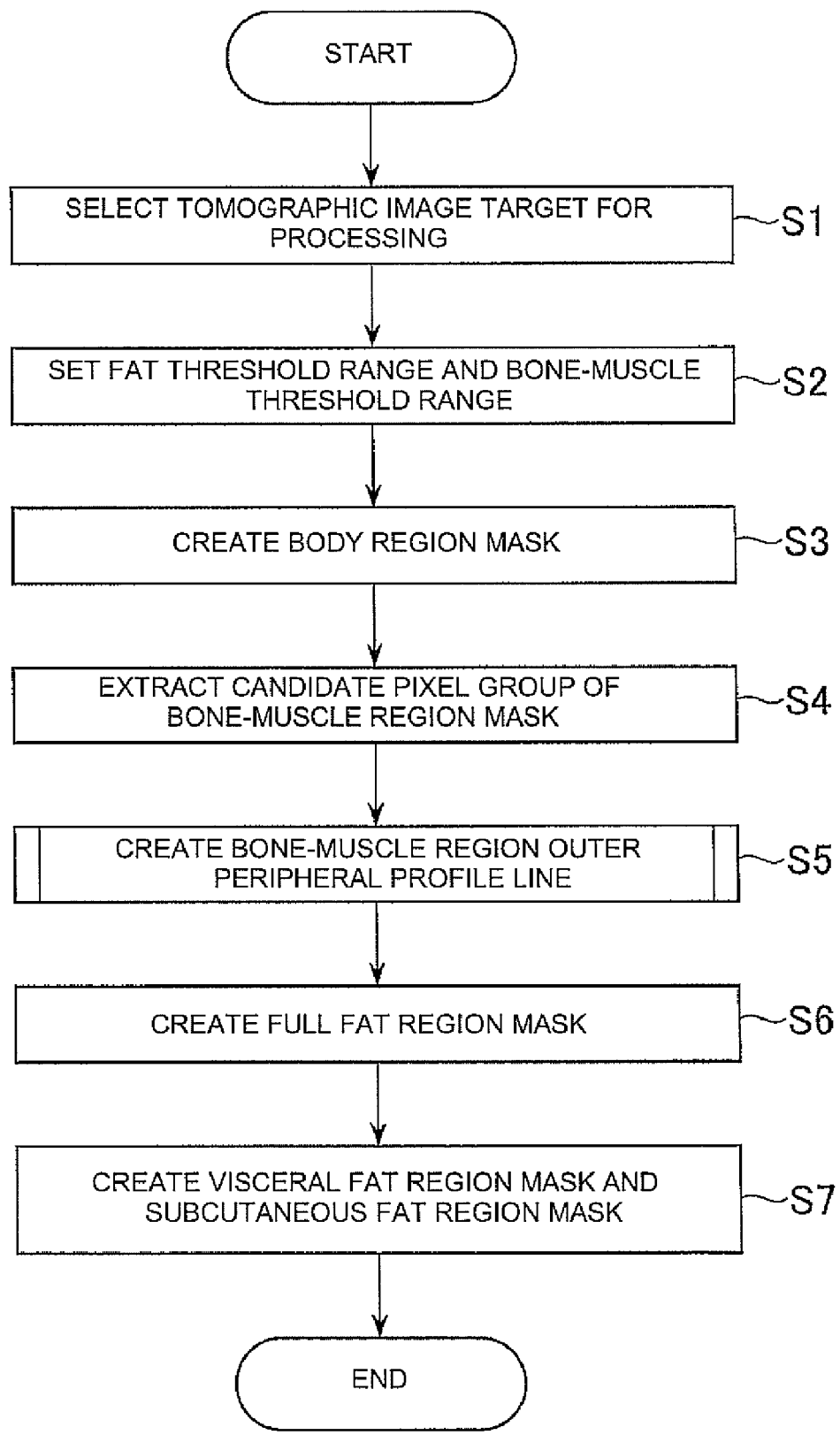
FIG. 3 is a diagram depicting one example of a flow of processing at the tomographic image processing apparatus illustrative of the one embodiment of the invention.

FIG. 3 is a diagram showing one example of a processing flow at the tomographic image processing apparatus 1.

Figure 4:
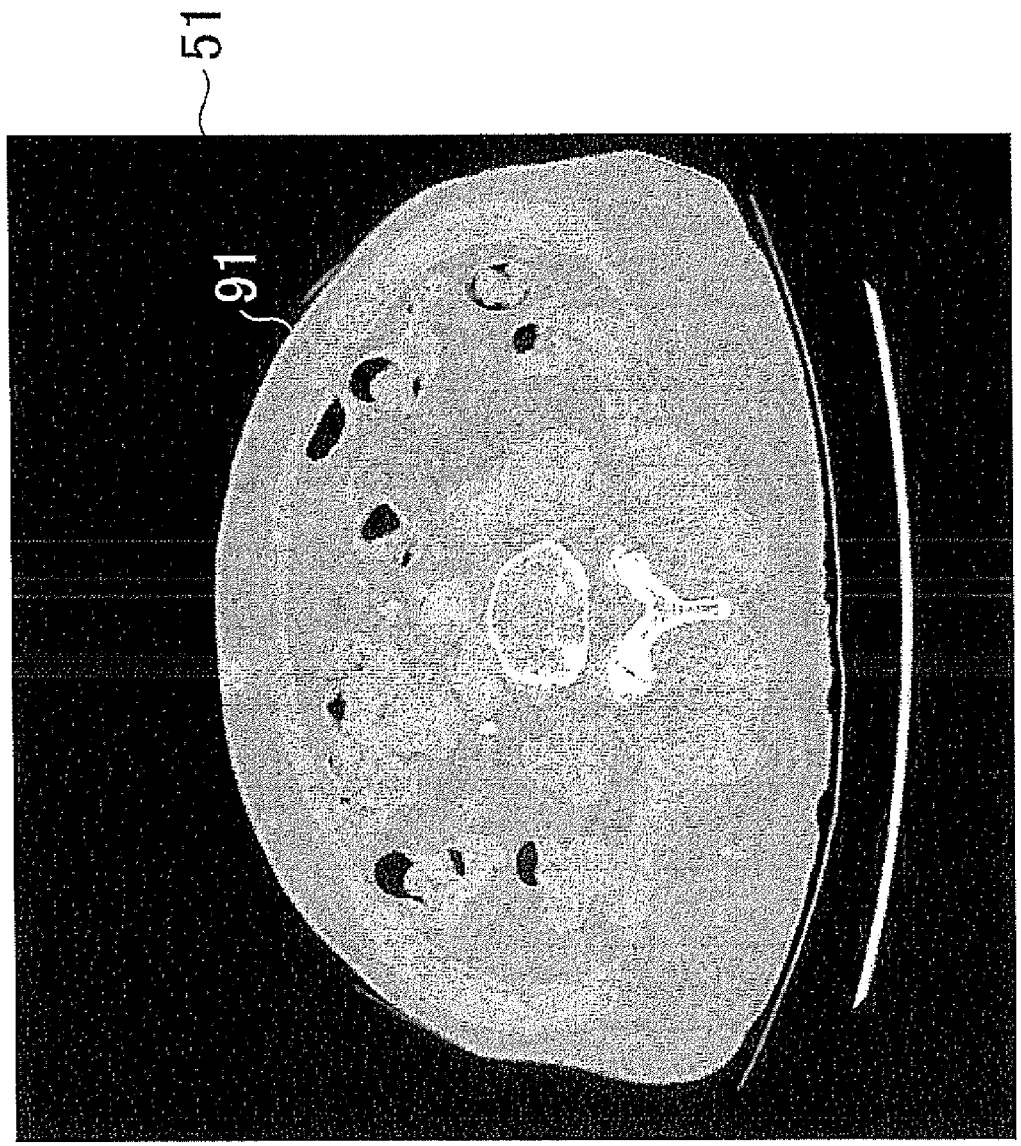
FIG. 4 is a diagram showing one example of a tomographic image target for processing.

At Step S1, a tomographic image 51 target for processing is selected. FIG. 4 is a diagram showing one example of a tomographic image target for processing. Here, an operator selects, as a target to be processed, a tomographic image 51 obtained by imaging or photographing such an abdominal region 91 of a subject as shown in FIG. 4, from a plurality of tomographic images stored in the magnetic disk 22, using the keyboard 25 and the mouse 26.

Figure 5:
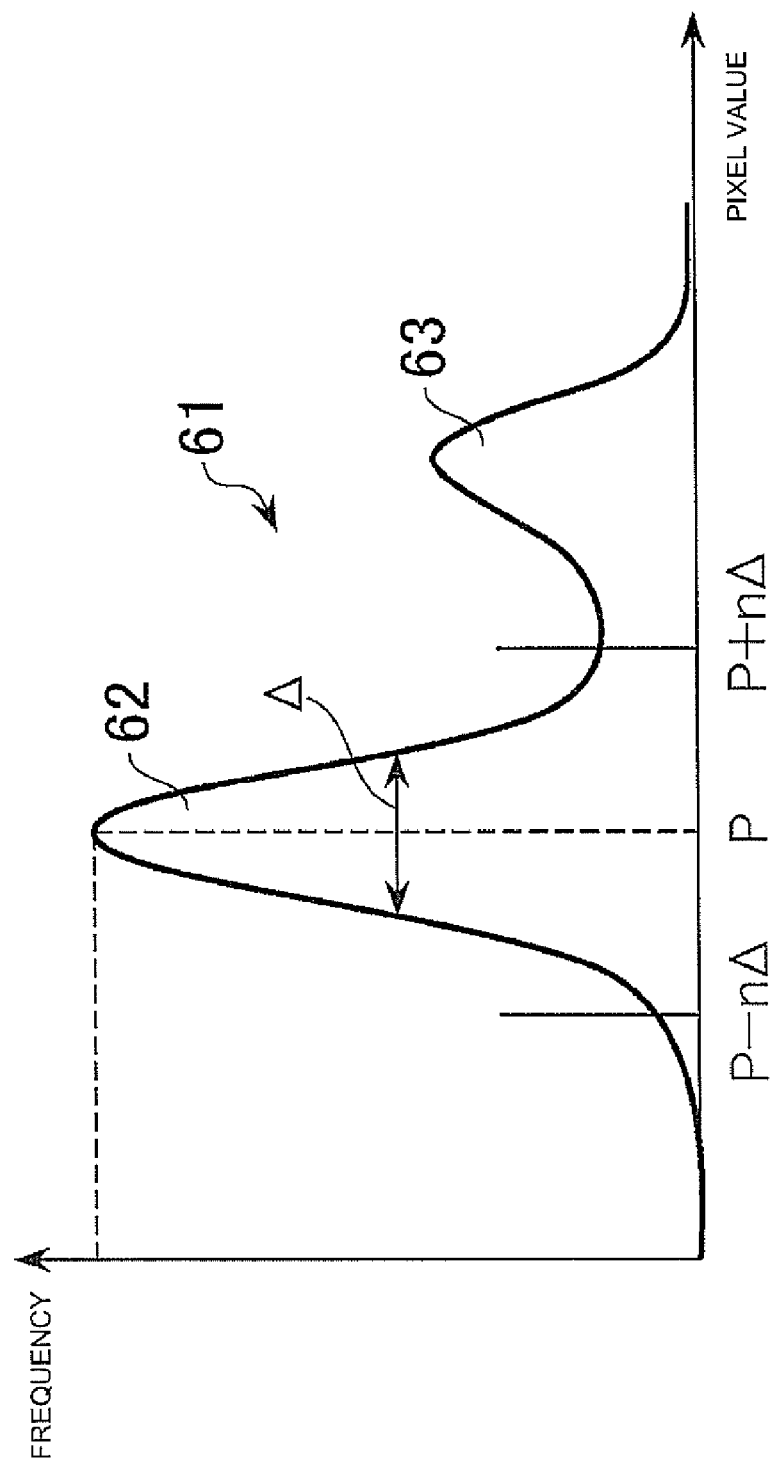
FIG. 5 is a diagram illustrating one example of a histogram of pixel values in the tomographic image.

At Step S2, a fat threshold range and a bone-muscle threshold range for the tomographic image 51 are set. FIG. 5 is a diagram showing one example of a histogram of pixel values at a tomographic image. Here, the threshold setting unit 18 creates a histogram 61 of pixel values such as shown in FIG. 5 with respect to the original image of the tomographic image 51 and sets each threshold range, based on the histogram 61. In the case of a CT image as shown in FIG. 5, the histogram 61 normally has a first mountain 62 and a second mountain 63 within a range of CT values from −200 to +200. The threshold setting unit 18 determines the first mountain 62 smaller in pixel value, of the two mountains as a mountain corresponding to fat and calculates a pixel value P that gives the peak and its full width half maximum Δ from the first mountain 62. The threshold setting unit 18 sets a range of P±n×Δ to a fat threshold range for extracting a fat region. Here, n indicates an arbitrary constant. The threshold setting unit 18 sets a predetermined range in which P+n×Δ+α equal to an upper limit threshold value P+n×Δ of the fat threshold range or slightly higher than it is defined as a lower limit threshold value, to a bone-muscle threshold range for extracting a bone muscle region. It is desirable to set an upper limit threshold value of the bone-muscle threshold range to +1000 or so in the case of the CT image. It is desirable to set the above parameter α to a value ranging from about 1 to 5 in the case of the CT image. It is thus possible to eliminate pixels having pixel values in which fat, bones and muscles are contained together, and more reliably separate and extract the fat region and the bone region. Incidentally, it is generally known that in the case of the CT image, the pixel value (CT value) corresponding to the fat ranges from about −200 to −20 and the pixel value corresponding to the bone or muscle ranges from about +20 to +1000. Thus, these ranges may be set as the fat threshold range and the bone-muscle threshold range respectively without determining the histogram 61 of the pixel values for the tomographic image 51.

Figure 6:
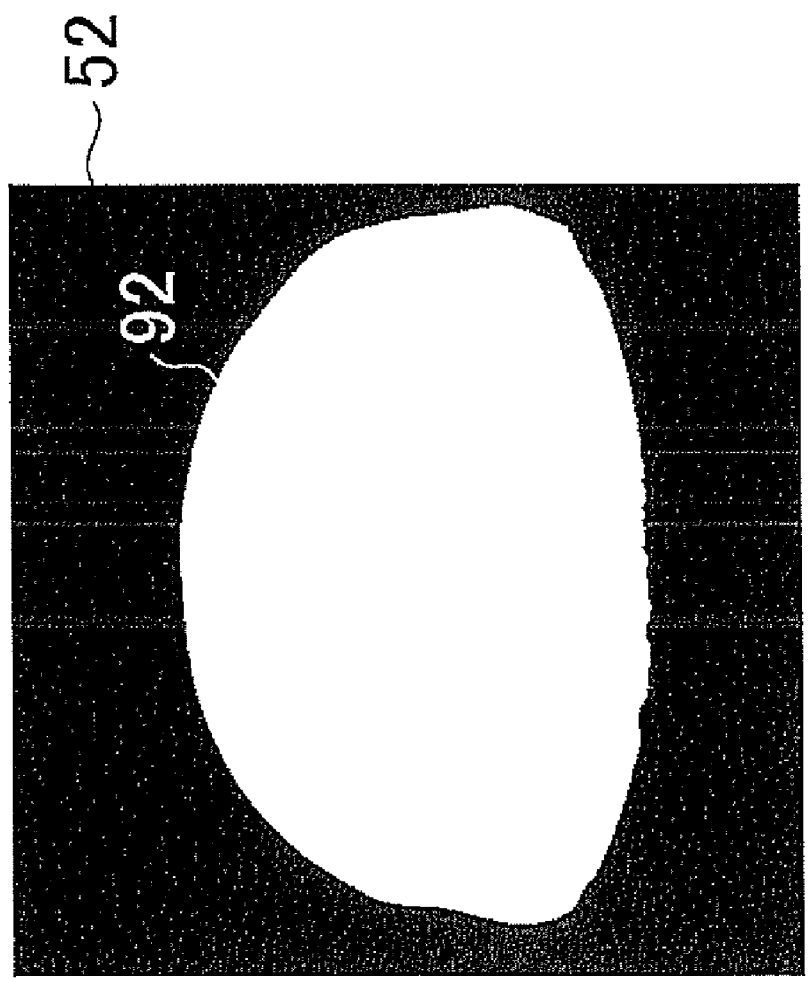
FIG. 6 is a diagram showing one example of a body region mask.

At Step S3, a body region mask 52 containing a subject's body region 92 at the tomographic image 51 is created. FIG. 6 is a diagram showing one example of a body region mask. Here, the body region identifying unit 11 performs labeling processing after the tomographic image 51 is binarized into a predetermined threshold value and leaves only a region having a maximum area, of regions subjected to the labeling processing. The body region identifying unit 11 calculates a profile line with respect to the left region and fills the inside of the profile line thereby to create such a body region mask 52 as shown in FIG. 6. Although the body region mask 52 normally contains the skin of the subject, there is a high possibility that the skin thereof will interfere with the extraction of a bone muscle region 94 to be described later. It is therefore desirable to perform contracting processing of the order of a few pixels on the body region mask 52 and eliminate the skin portion. Incidentally, a value ranging from about −300 to −150 is desired as the threshold value for above binarization in the case of the CT image.

Figure 7:
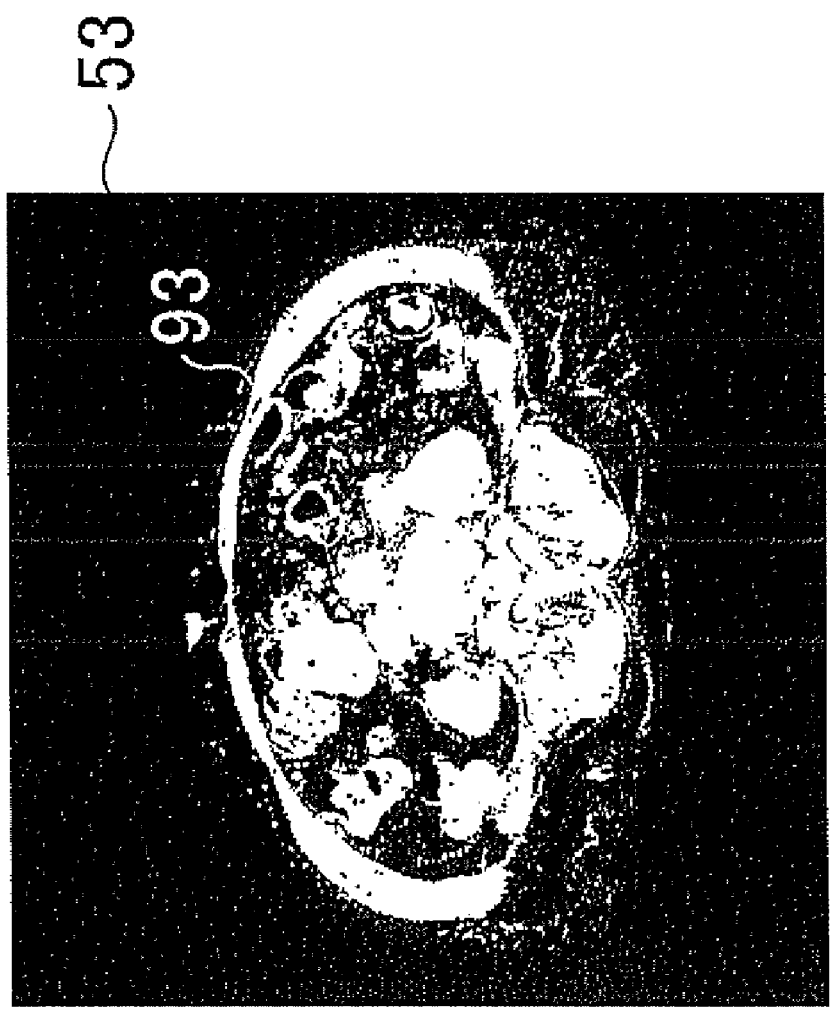
FIG. 7 is a diagram illustrating one example of a bone-muscle candidate region image.
Figure 8:
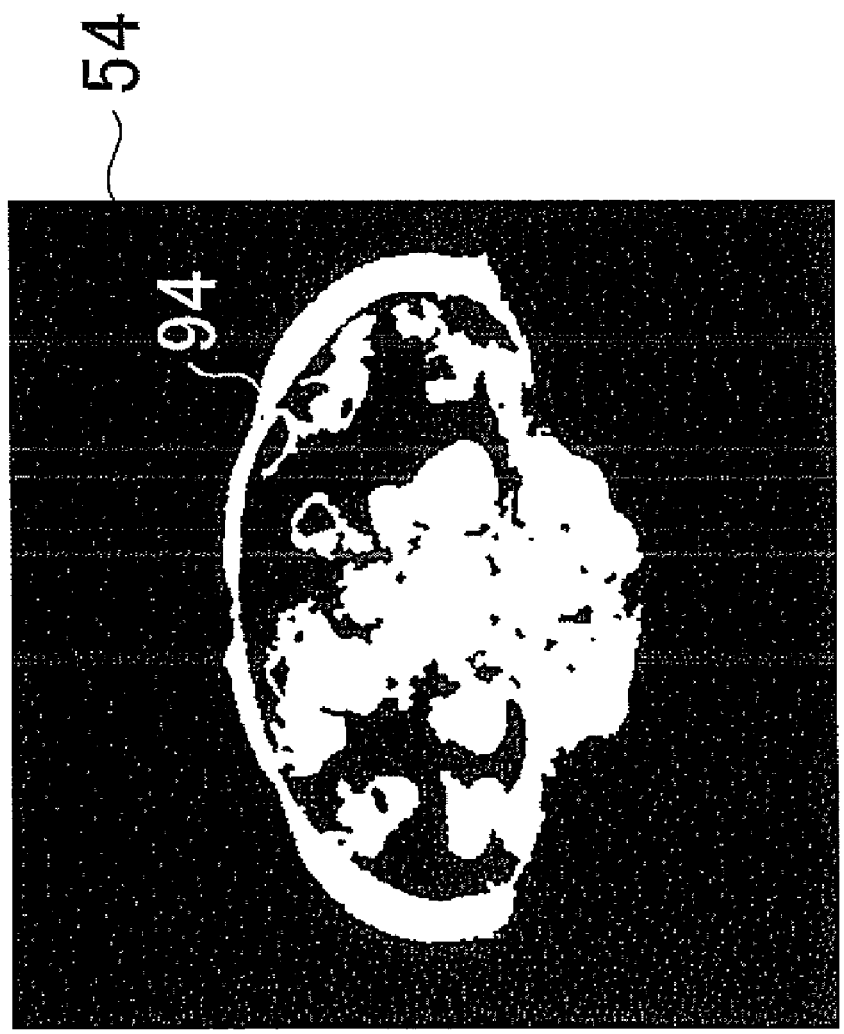
FIG. 8 is a diagram depicting one example of a bone-muscle region mask.

At Step S4, a candidate pixel group (candidate region) 93 of a bone-muscle region mask is extracted and a bone-muscle region mask 54 is created based on the candidate pixel group 93. FIG. 7 is a diagram showing one example of a bone-muscle candidate region image 53 containing the candidate pixel group 93 of the bone-muscle region mask. FIG. 8 is a diagram showing one example of the bone-muscle region mask 54. Here, the bone-muscle region extracting unit 12 performs the following processing. The bone-muscle region extracting unit 12 first sets each bone muscle pixel having a pixel value lying within the bone-muscle threshold range set at Step S2 at the tomographic image 51, of pixels corresponding to the body region 92 at the body region mask 52 created at Step S3, to a candidate pixel for the bone-muscle region mask. Thus, such a candidate pixel group 93 of bone-muscle region mask as shown in FIG. 7 is obtained. The candidate pixel group 93 of the bone-muscle region mask is normally formed with a large number of regions constituted of a plurality of continuous pixels as shown in FIG. 7. The regions have areas of varying sizes. Next, the bone-muscle region extracting unit 12 performs expanding processing on the candidate pixel group 93 of the bone-muscle candidate mask after the contracting processing has been effected thereon, and eliminates regions small in area from the large number of regions formed by the candidate pixel group 93 of the bone-muscle region mask. Thus, a bone-muscle region mask 54 containing a bone muscle region 94 corresponding to essential parts of bones and muscles such as shown in FIG. 8 is created. Incidentally, for example, an erosion process and a dilation process at morphology processing can be used as the contracting processing and the expanding processing.

At Step S5, boundary points B1, B2, ..., BN in the bone muscle region 94 are searched on the bone-muscle region mask 54 and joined together sequentially to create an outer peripheral profile line 55 of the bone muscle region.

Figure 9:
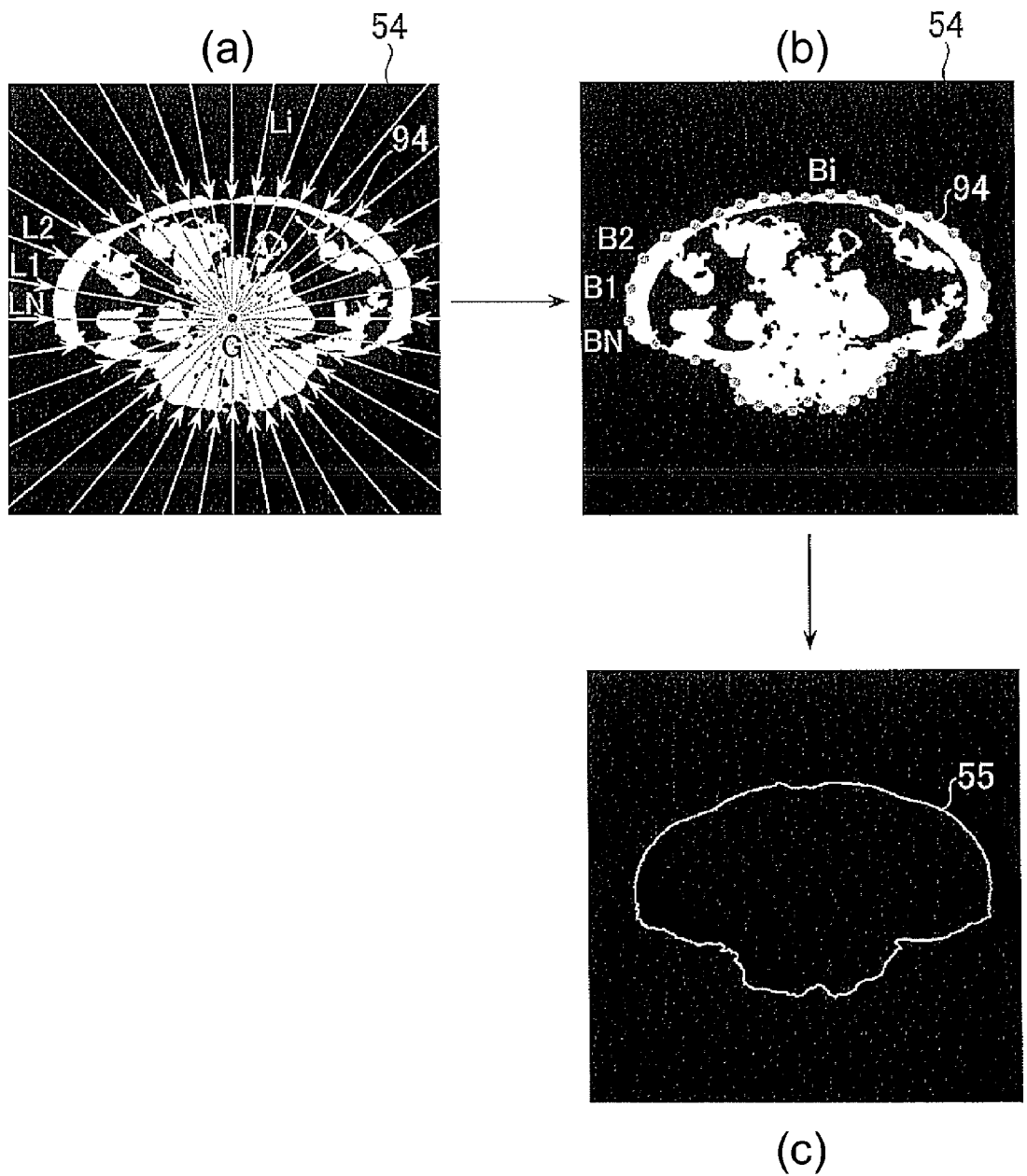
FIGS. 9(a), 9(b), and 9(c) are diagrams for describing the process of creating an outer peripheral profile line at the bone-muscle region mask.

FIGS. 9(a), 9(b), and 9(c) are diagrams for describing the process of creating the outer peripheral profile line 55 of the bone muscle region at the bone-muscle region mask 54. Here, the bone-muscle region outer peripheral profile line creating unit 14 performs the following processing. The bone-muscle region outer peripheral profile line creating unit 14 first determines the gravity center of a body region 92 at a body region mask 52 and sets a point C corresponding to the gravity center thereof at the bone-muscle region mask 54. Next, the bone-muscle region outer peripheral profile line creating unit 14 sets a plurality of straight lines Li, such as L1, L2, ..., LN, extending radially in all directions through the point G in increments of a predetermined angle at the bone-muscle region mask 54 as shown in FIG. 9(a). The bone-muscle region outer peripheral profile line creating unit 14 searches a firstly pixel-value varying point from outside to inside (point G) on these straight lines and defines the point as a boundary point of a bone muscle region 94. Incidentally, other point located in the vicinity of the center of the bone muscle region 94 may be adopted in place of the gravity center of the body region mask 52. For example, the point may be, for example, the center of a quadrangle circumscribed around the body region 92, the gravity center of the bone muscle region 94 or the center of a quadrangle circumscribed around the bone muscle region 94, or the like.

A large number of boundary points Bi, such as B1, B2, ..., BN, as shown in FIG. 9(b), for example, are obtained in this way. Incidentally, although FIG. 9(b) shows an example in which the point is searched on the straight lines provided in increments of 10 degrees for convenience, the point may preferably be searched on straight lines provided in increments of a predetermined angle ranging from greater than or equal to 1° to less than or equal to 5° in practice in consideration of the balance between a calculated amount and the accuracy of the outer peripheral profile line 55. The bone-muscle region outer peripheral profile line creating unit 14 sequentially joins the searched boundary points of bone muscle region 94 together thereby to create such an outer peripheral profile line 55 of bone muscle region as shown in FIG. 9(c).

On the other hand, although no cuts are formed in the bone muscle region in the example of FIG. 9(c), there is also a case in which cuts exist in the outer periphery of the bone muscle region and the region is partly unconnected or cut, depending upon a subject. There is a case in which when boundary points are searched on a bone-muscle region mask containing a bone muscle region with each cut, a boundary point is detected at part of the bone muscle region lying inside the cut. The boundary point corresponding to such a cut exists in a position shifted from on the originally-intended outer peripheral profile line of the bone muscle region.

Thus, the bone-muscle region outer peripheral profile line creating unit 14 actually joins together only boundary points (hereinafter called also proper boundary points) at which each index related to at least one of the length and slope of a line segment that connects between adjoining boundary points meets or satisfies a predetermined condition, in order to eliminate the boundary point corresponding to each cut, thereby to create an outer peripheral profile line 55 of a bone muscle region. Incidentally, here, the bone-muscle region outer peripheral profile line creating unit 14 changes a condition for discriminating a proper boundary point in consideration of a shape characteristic of a bone muscle region 93 where a boundary point to be noted is located near the front of the subject as viewed from the point G corresponding to the gravity center of the body region 92 and where the boundary point is located near the back side thereof.

A processing flow for creating the outer peripheral profile line of the bone muscle region, which is executed at Step S5, will now be explained.

Figure 10:
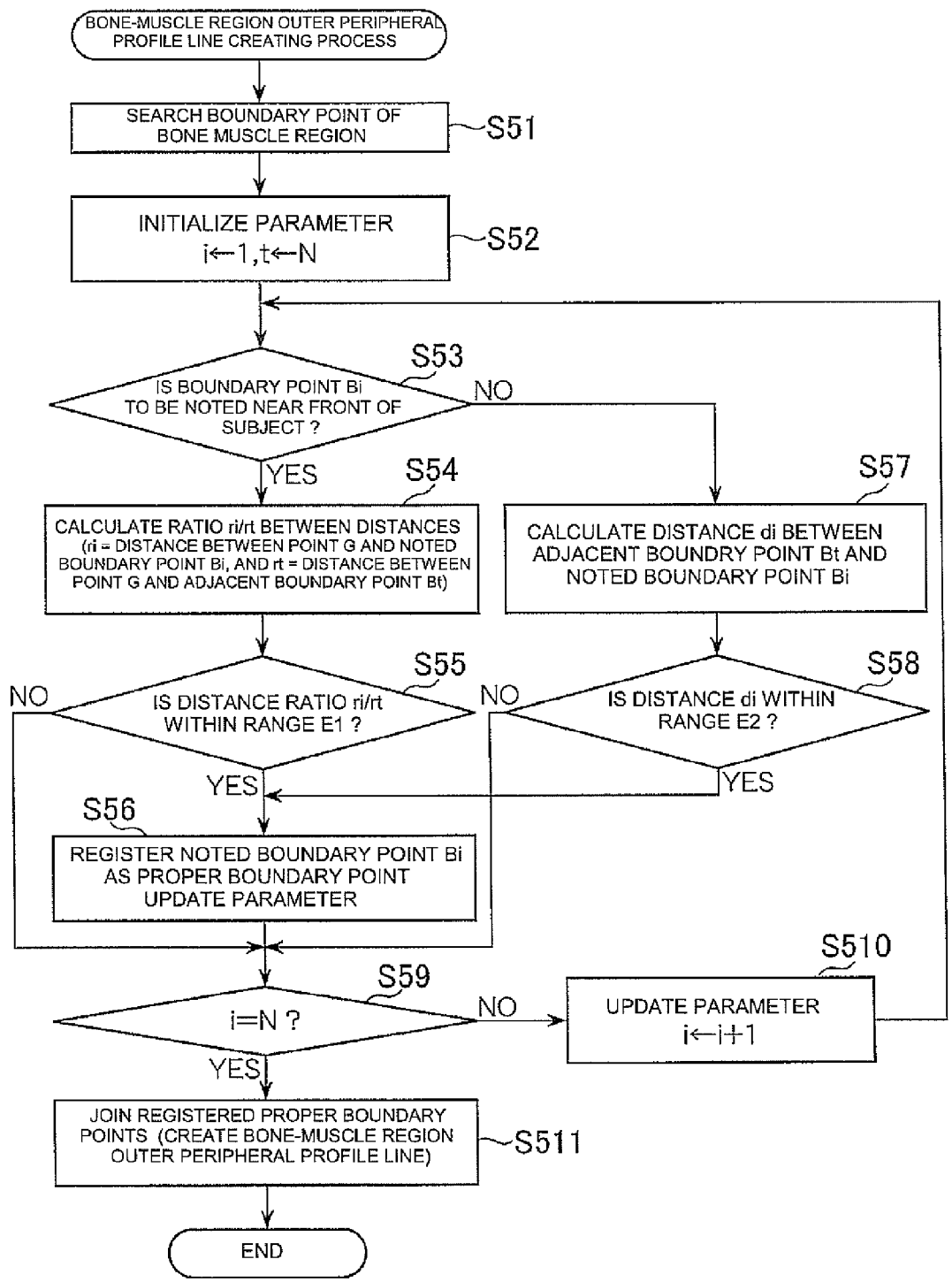
FIG. 10 is a diagram showing a processing flow for creating the outer peripheral profile line of the bone-muscle region mask.
Figure 11:
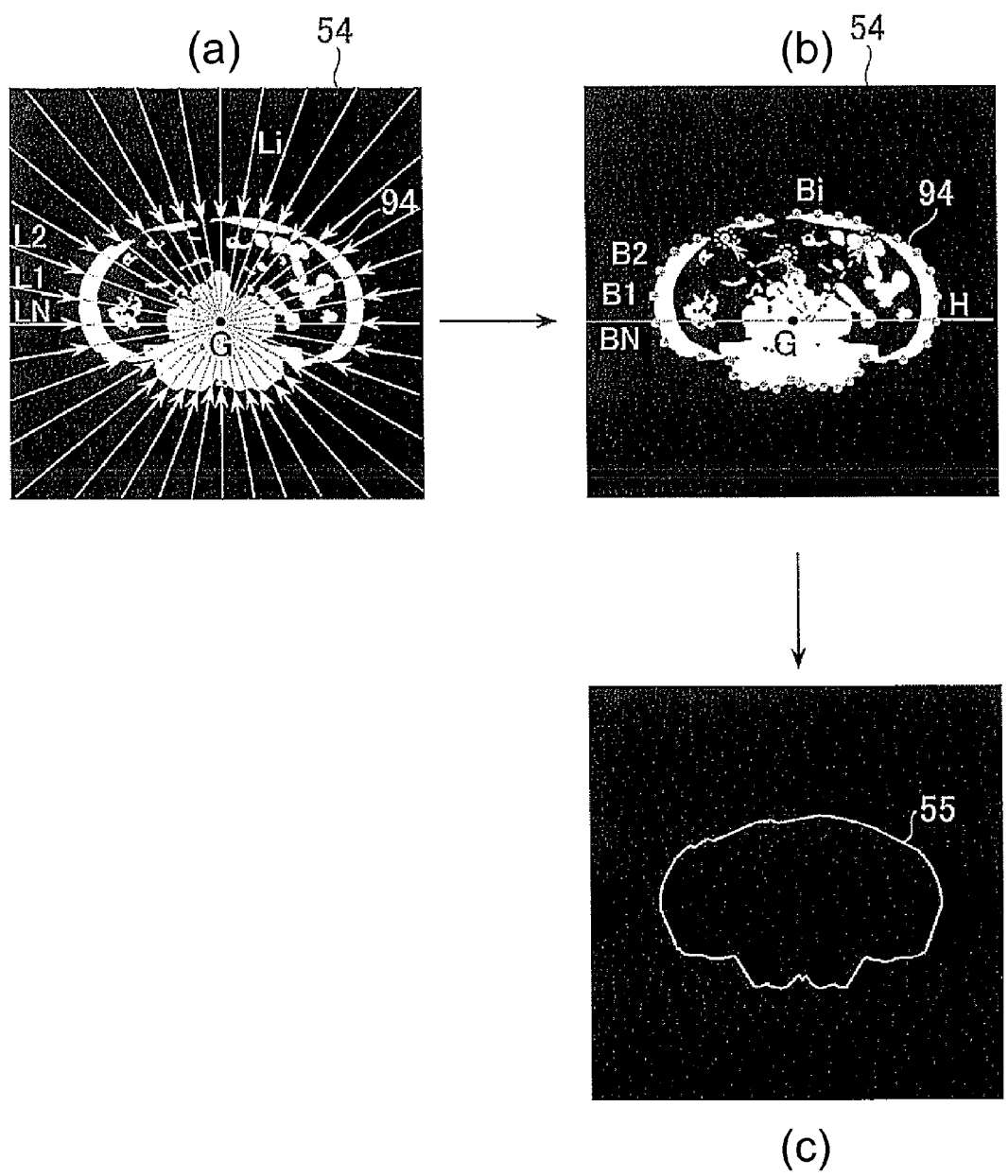
FIGS. 11(a), 11(b), and 11(c) are diagrams for describing the process of creating an outer peripheral profile line at a bone-muscle region mask with cuts.

FIG. 10 is a diagram showing a processing flow for creating an outer peripheral profile line of a bone muscle region. FIG. 11 are diagrams for describing the process of creating an outer peripheral profile line 55 at a bone-muscle region mask containing a bone muscle region with cuts.

At Step S51, a plurality of straight lines extending radially in all directions, e.g., straight lines L1, L2, ..., LN are sequentially set clockwise on a bone-muscle region mask 54 as shown in FIG. 11(a). Boundary points in the bone muscle region are searched along these straight lines. As a result, boundary points B1, B2, ..., BN are shifted partly away from on the outer peripheral profile line of the bone muscle region such as shown in FIG. 11(b) are obtained.

At Step S52, parameters i and t for specifying or identifying a boundary point Bi to be noted and its adjacent boundary point Bt are respectively initialized into i=1 and t=N.

At Step S53, it is determined whether the position of the noted boundary point Bi approaches the front of the subject as viewed from a point G. In the example of FIG. 11(b), for example, a decision is made as to whether the position of the noted boundary point is located on the upper side (approaches the front) or the lower side (approaches the back side) as viewed from the horizontal line H passing through the point G.

When it is determined at Step S53 that the position of the noted boundary point Bi approaches the front, the processing flow proceeds to Step S54, where it is discriminated based on the rate of change in the distance between the point G and the corresponding boundary point whether the noted boundary point Bi corresponds to a proper boundary point (this is called "first discriminating process"). Since the outer peripheral profile line of the bone muscle region becomes a shape close to or near an arc lying on an ellipse on the front side of the subject, such discrimination based on the rate of change in the distance between the point G corresponding to the gravity center of the body region mask 52 and its corresponding boundary point is effective.

On the other hand, when it is determined at Step S53 that the position of the boundary point to be noted approaches the back side, the processing flow proceeds to Step S57, where it is discriminated based on the size of distance between adjoining boundary points whether the noted boundary point Bi corresponds to a proper boundary point (this is called "second discriminating process"). Since the outer peripheral profile line of the bone muscle region becomes a relatively complicatedly-bent curvilinear shape on the back side of the subject, such discrimination based on the size of distance between the boundary points is effective.

Figure 12:
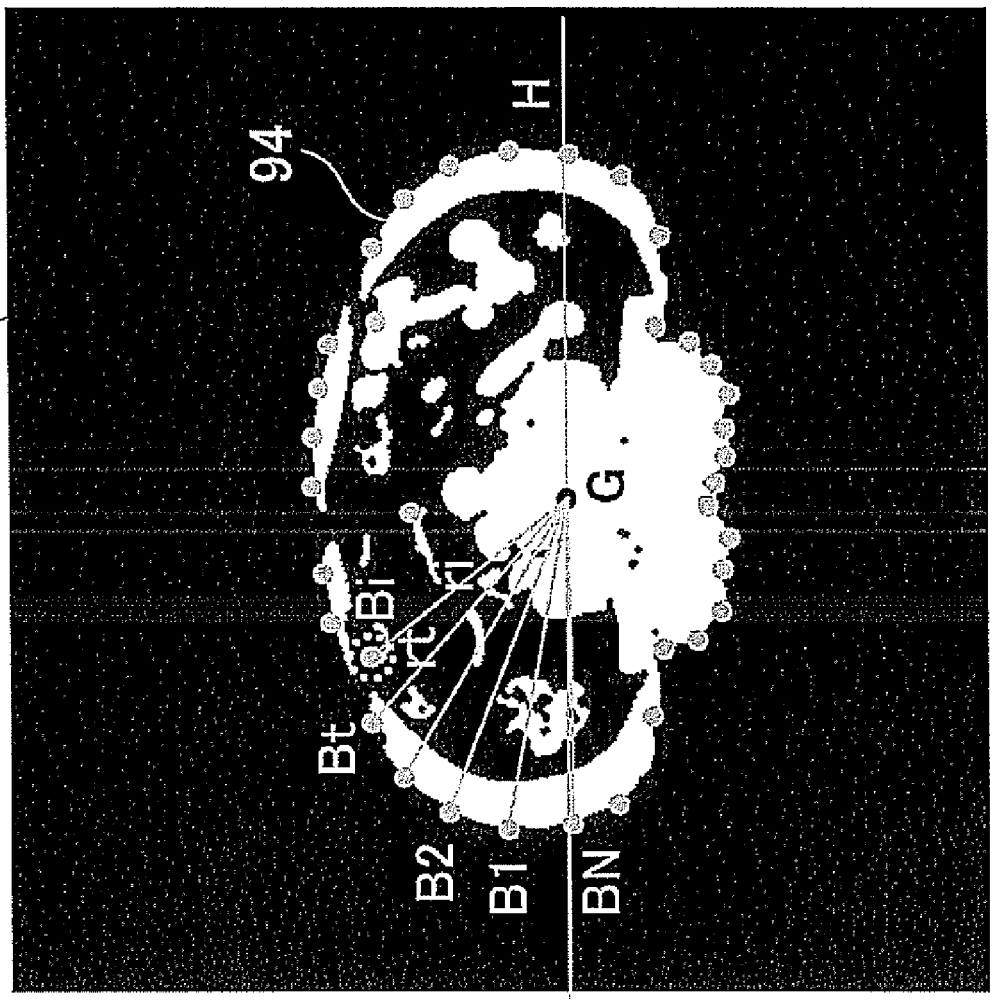
FIG. 12 is a diagram for describing a first determining process.

FIG. 12 is a diagram for describing the first discriminating process.

In the first discriminating process, a ratio ri/rt between a distance rt from a point G to an adjacent boundary point Bt and a distance ri from the point G to a boundary point Bi to be noted is calculated as shown in FIG. 12 (Step S54). It is determined whether the ratio ri/rt falls within a predetermined range E1 (Step S55). When it is now determined that the ratio ri/rt is within the predetermined range E1, the noted boundary point Bi is discriminated as being a proper boundary point and is registered. In addition, the noted boundary point Bi is set to the parameter t=i (Step S56). On the other hand, when it is determined that the ratio ri/rt is not within the predetermined range E1, the noted boundary point Bi is discriminated as being not a proper boundary point. That is, the noted boundary point Bi is discriminated as being a boundary point corresponding to a cut of a bone-muscle region mask, and the processing flow proceeds to the following Step S59 without registering the noted boundary point Bi. Incidentally, when, for example, each of incremental angles among straight lines L1, L2, . . . , LN for defining a position to be searched is 1°, the range E1 can be set from greater than or equal to 0.8 to less than or equal to 1.2, preferably, greater than or equal to 0.9 to less than or equal to 1.1. That is, when the distance from the point G to each boundary point is calculated sequentially, only a boundary point at which the rate of change in the distance falls within ±20%, preferably ±10% is discriminated as being a proper boundary point.

Figure 13:
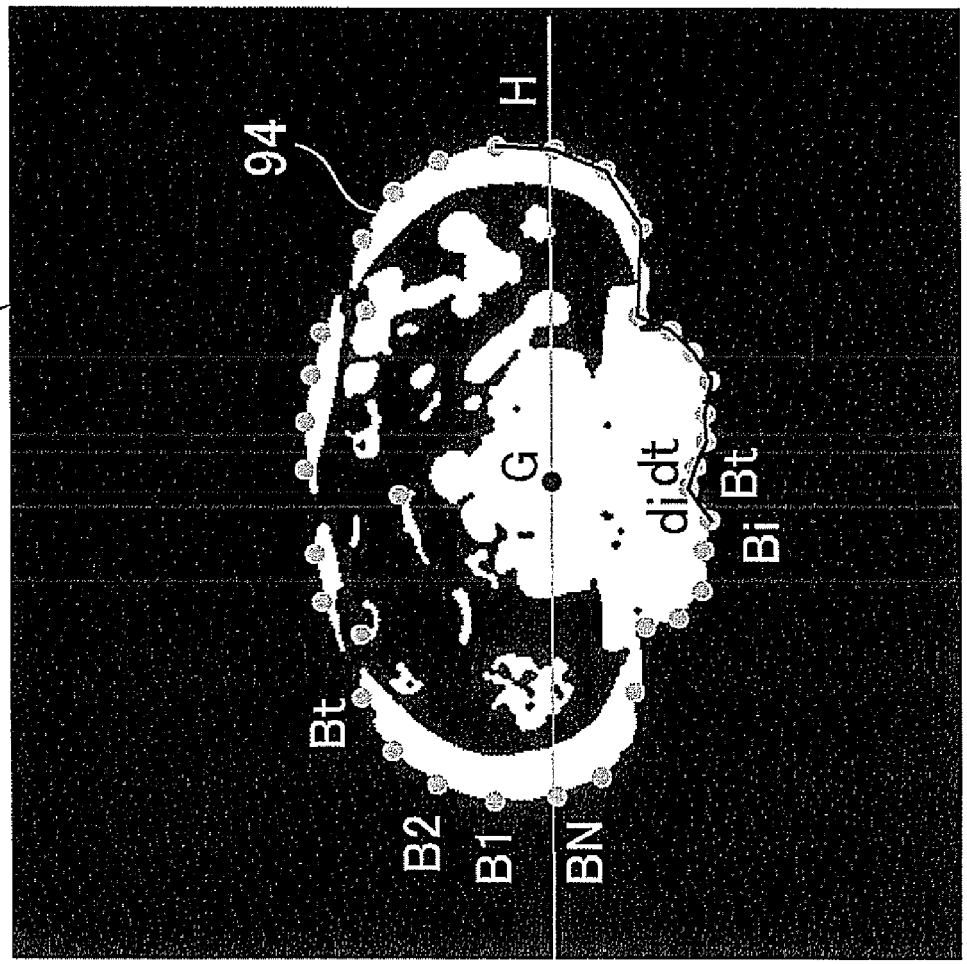
FIG. 13 is a diagram for describing a second determining process.

FIG. 13 is a diagram for describing the second discriminating process.

In the second discriminating process, a distance di between an adjacent boundary point Bt and a boundary point Bi to be noted is calculated as shown in FIG. 13 (Step S57). It is determined whether the distance di falls within a predetermined range E2 (Step S58). When it is now determined that the distance di is within the predetermined range E2, the noted boundary point Bi is discriminated as being a proper boundary point and is registered. In addition, the noted boundary point Bi is set to the parameter t=i (Step S56). On the other hand, when it is determined that the distance di is not within the predetermined range E2, the noted boundary point Bi is discriminated as being not a proper boundary point. The processing flow proceeds to the following Step S59 without registering the noted boundary point Bi. Incidentally, when, for example, each of incremental angles among straight lines L1, L2, . . . , LN for defining a position to be searched is 1°, the predetermined range E2 can be set to a range equivalent to less than or equal to any length of 2% to 10%, preferably, 4% to 6% of an inside diameter average AR of an ellipse at the time that the body region 92 is made approximate to the ellipse, or an average AR' of a minor-axis diameter of the ellipse and a major-axis diameter thereof.

At Step S59, a decision is made as to whether the parameter i=N to confirm whether yet unset boundary points remain at the noted boundary point. When the answer is affirmative here, all boundary points registered are joined together to create an outer peripheral profile line 55 of a bone muscle region (S511), after which the processing is ended. On the other hand, when the answer is found to be negative, the parameter i is incremented to yield i=i+1 (S510), and the processing flow returns to Step S53.

Such an intended outer peripheral profile line 55 as shown in FIG. 11(c), for example, can be obtained in this manner.

Figure 14:
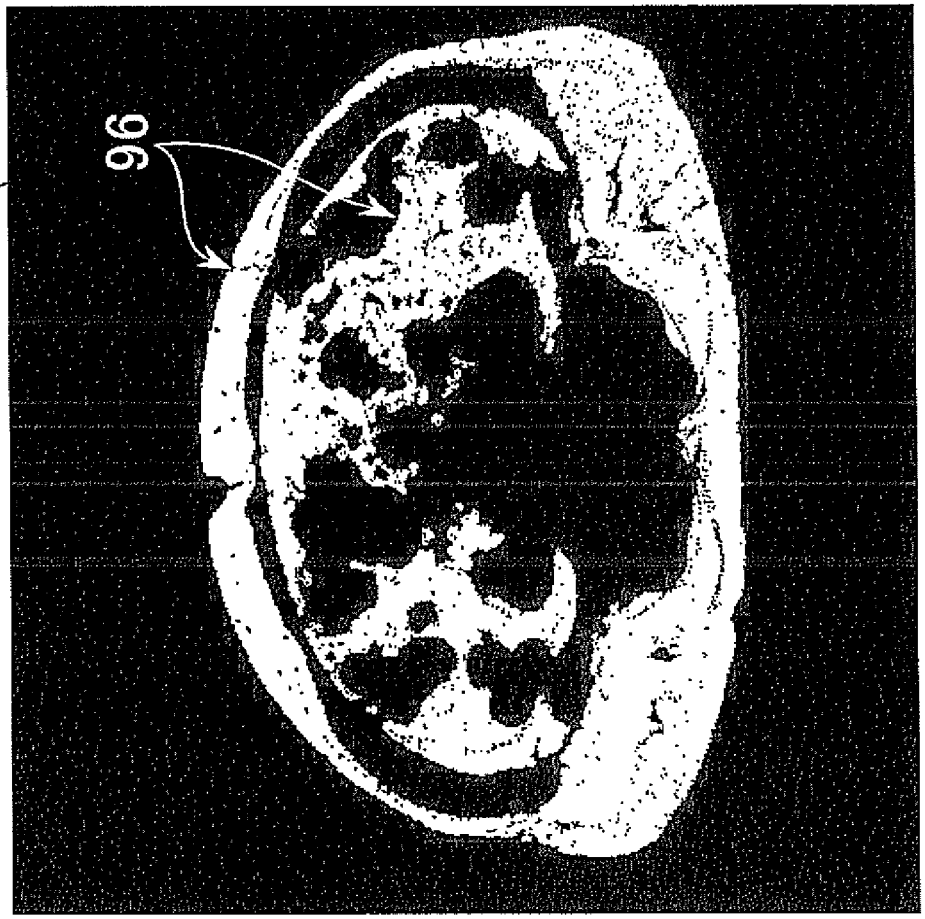
FIG. 14 is a diagram showing one example of a full fat region mask.

At Step S6, a full fat region mask 56 containing a subject's full fat region 96 at the tomographic image 51 is created. Here, the full fat region extracting unit 15 creates a full fat region mask 56 in such a manner that it contains a fat region V1 obtained by subtracting the bone-muscle region mask 54 created at Step S4 from the body region mask 52 created at Step S3. Incidentally, the full fat region extracting unit 15 may create the full fat region mask 56 using a method other than it. At the tomographic image 51, for example, the full fat region mask 56 may be created so as to contain a fat region V2 constituted of the pixels having the pixel values lying within the fat threshold range set at Step S2. Alternatively, the full fat region mask 56 may be created so as to contain a region (V1 or V2) corresponding to the sum of the fat region V1 and the fat region V2, or the full fat region mask 56 may be created so as to contain a region (V1 and V2) at which the fat region V1 and the fat region V2 overlap. Such a full fat region mask 56 as shown in FIG. 14 by way of example is created in this way.

Figure 15:
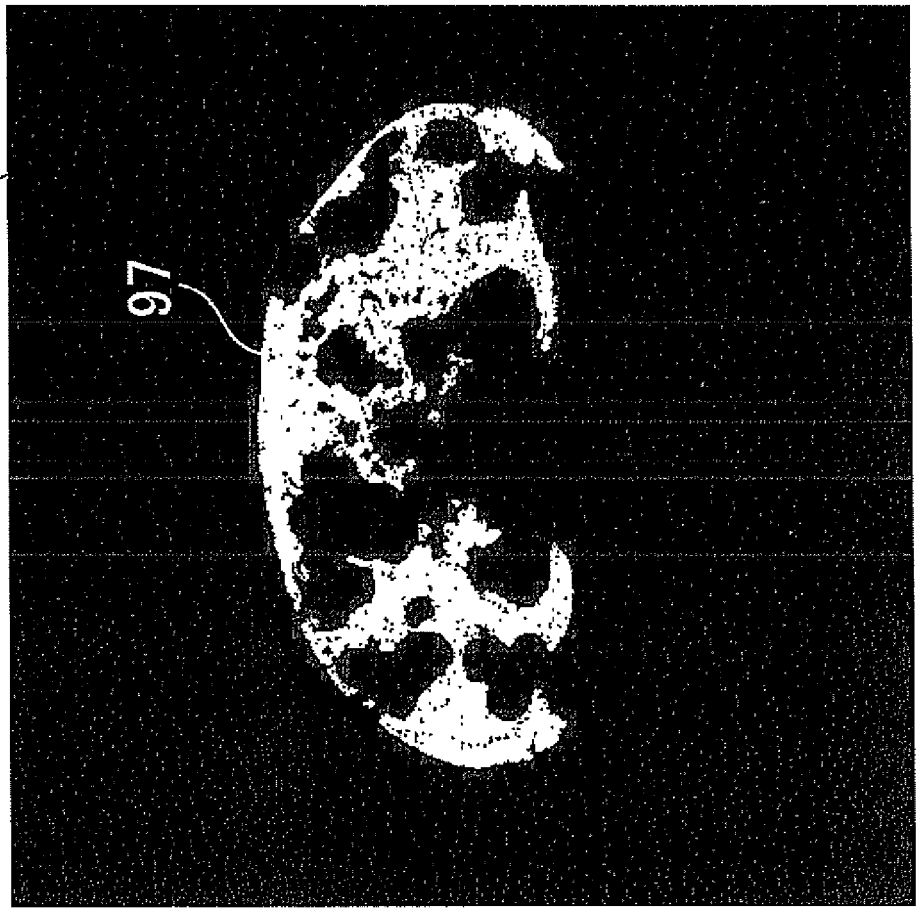
FIG. 15 is a diagram illustrating one example of a visceral fat region mask.
Figure 16:
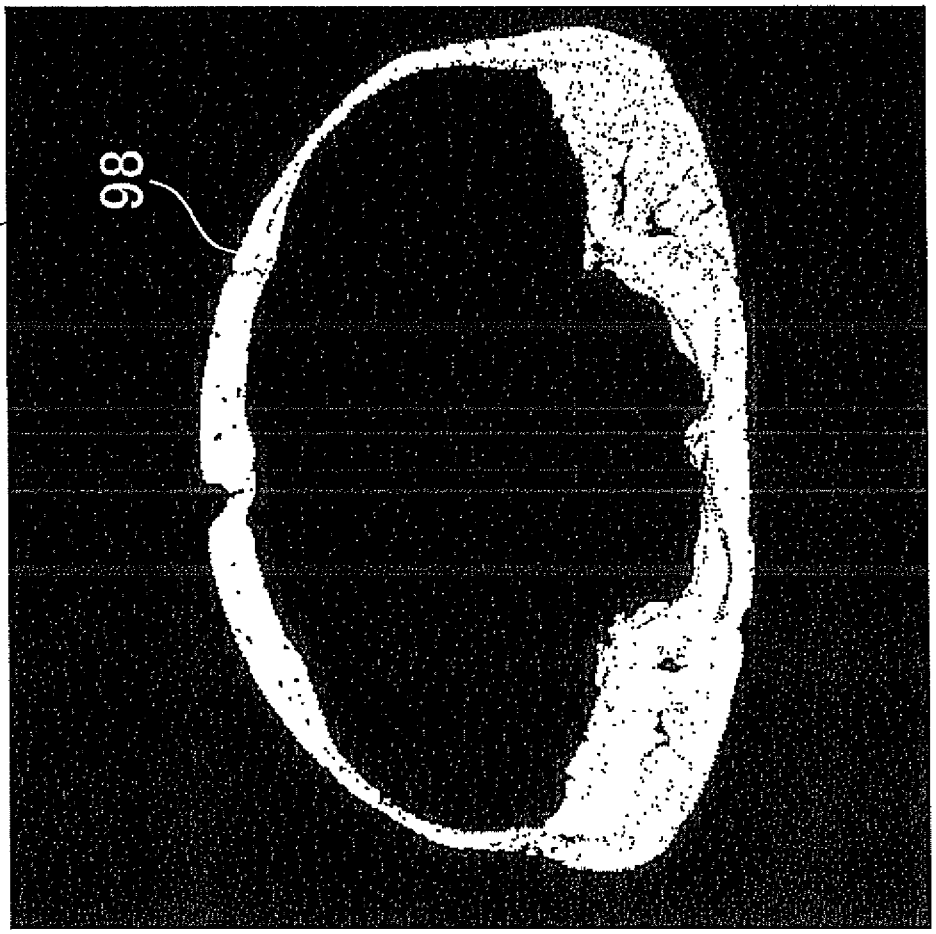
FIG. 16 is a diagram depicting one example of a subcutaneous fat region mask.
Figure 17:
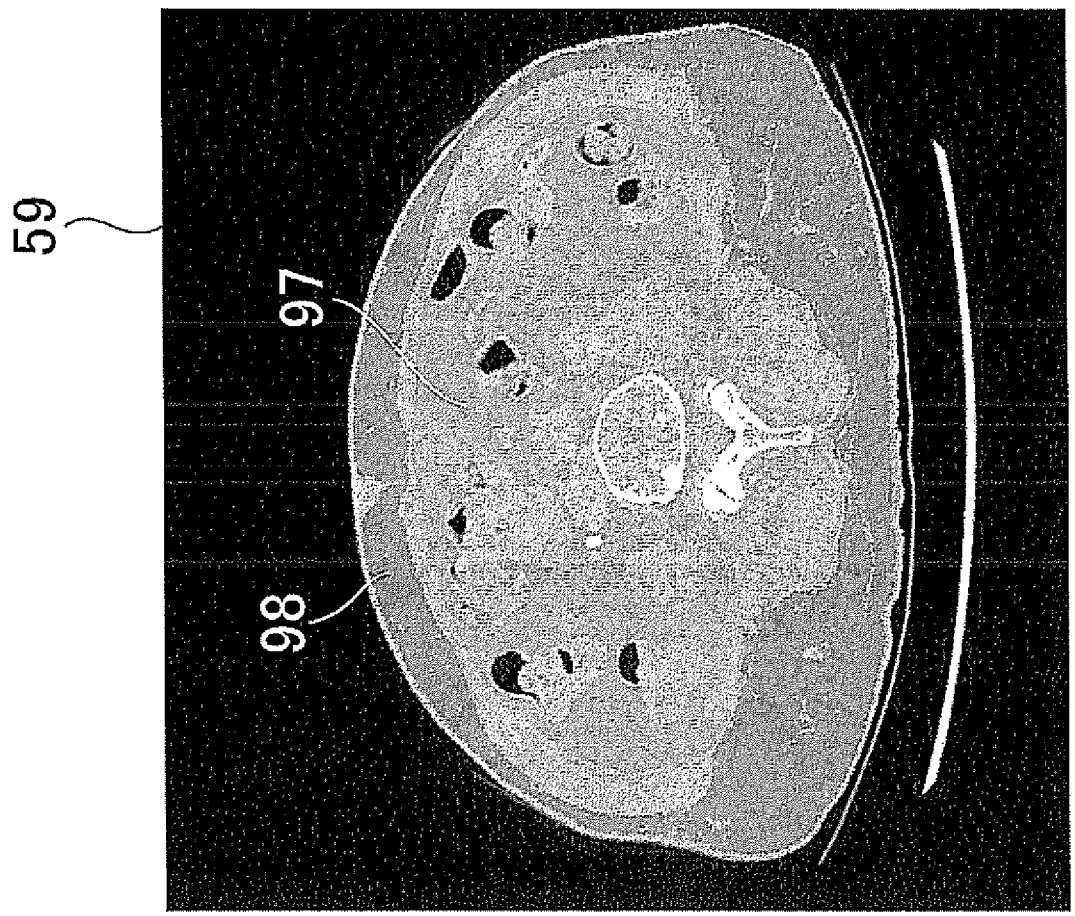
FIG. 17 shows one example of a tomographic image in which a visceral fat region and a subcutaneous fat region are separated and displayed by color.

At Step S7, a visceral fat region mask 57 and a subcutaneous fat region mask 58 are created. Here, the visceral fat region extracting unit 16 creates a visceral fat region mask 57 with a region corresponding to the inside of the outer peripheral profile line 55 created at Step S5, of the full fat region 96 at the full fat region mask 56 created at Step S6, as a visceral fat region 97. The subcutaneous fat region extracting unit 17 creates a subcutaneous fat region mask 58 with a region corresponding to the outside of the outer peripheral profile line 55, of the full fat region 96 at the full fat region mask 56, as a subcutaneous fat region 98. For example, such a visceral fat region mask 57 as shown in FIG. 15 and such a subcutaneous fat region mask 58 as shown in FIG. 16 are created in this way. Incidentally, when the visceral fat region 97 at the visceral fat region mask 57 and the subcutaneous fat region 98 at the subcutaneous fat region mask 58 are respectively projected onto the original image of the tomographic image 51 in arbitrary colors, such a fat-separated tomographic image 59 as shown in FIG. 17, in which the visceral fat region 97 and the subcutaneous fat region 98 are separated by color, can be obtained. By expanding image data indicative of the fat-separated tomographic image 59 onto the VRAM 23, such a fat-separated tomographic image 59 can be displayed on the monitor 24. If the number of pixels corresponding to the visceral fat region 95 and the number of pixels corresponding to the subcutaneous fat region 96 are determined at the fat-separated tomographic image 59, and the respective numbers of pixels are multiplied by an actual area per pixel, then a visceral fat area and a subcutaneous fat area can be obtained.

According to the above embodiment, a bone muscle region constituted of bone muscle pixels having pixel values corresponding to bones or muscles excluding a skin region of a subject's body region at a tomographic image is extracted. Each boundary point in the bone muscle region is searched from outside to inside. Of the searched boundary points, only boundary points at which an index related to at least one of the distance between the adjoining boundary points and the slope of each straight line connecting between the adjoining boundary points meets or satisfies a predetermined condition, are joined together to create a bone-muscle region outer peripheral profile line. A visceral fat region constituted of fat pixels having pixel values corresponding to fat at a region lying inside the bone-muscle region outer peripheral profile line is extracted. Therefore, a profile or contour of a region considered to contain only the visceral fat region as a fat region can be determined by detecting only boundary points having a high possibility that they will be disposed on the profile, by a relatively simple process and joining these together. A subject's visceral fat region at the tomographic image can be separated and extracted from a subcutaneous fat region in a short period of time and more accurately.

Incidentally, the invention is not limited to the embodiment referred to above. Various changes can be made unless they depart from the spirit of the invention.

In the above embodiment, the bone-muscle region outer peripheral profile line creating unit 14 properly uses both the first and second discriminating approaches or methods according to the position of each boundary point to be noted when boundary points corresponding to cuts of a bone-muscle region mask are discriminated. However, the invention is however not limited to it. For instance, the first discriminating method and the second discriminating method are used for all boundary points, and a boundary point discriminated as a boundary point corresponding to each cut by either the first discriminating method or the second discriminating method may be ignored. Alternatively, only the first discriminating method may be used for all the boundary points. Only the second discriminating method may be used therefor.

Figure 18:
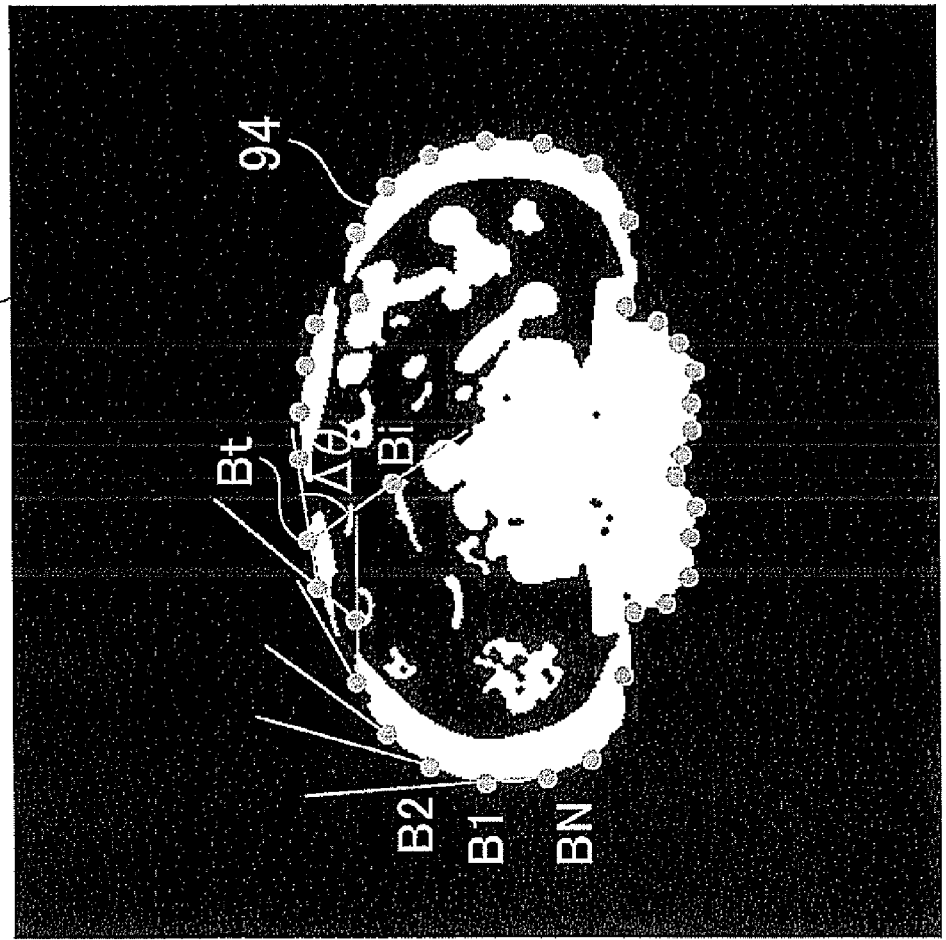
FIG. 18 is a diagram for describing a method for discriminating boundary points corresponding to cuts, based on the amount of change in the slope of a line segment that connect between adjoining boundary points.

In the above embodiment as well, when it is discriminated whether boundary points to be noted correspond to boundary points to be joined, the bone-muscle region outer peripheral profile line creating unit 14 performs its discrimination, based on a criterion or reference related to the distance from the point G corresponding to the gravity center of the body region mask 52 to its corresponding boundary point or the distance between the boundary points. The invention is however not limited to it. When the slope θ of each line segment that connects between adjoining boundary points is sequentially calculated as shown in FIG. 18, for example, each boundary point to be noted may be discriminated as being a boundary point to be joined, where the amount of change Δθ in the slope θ is within a predetermined angle E3 in the vicinity thereof. The angle E3 can be set from 20° to 60°, typically, 45° or so where, for example, each boundary point to be noted is located on the frontal side of the subject.

The bone-muscle region outer peripheral profile line creating unit 14 may use these discriminating processes according to the position of each boundary point or in combination in various ways regardless of the position.

Figure 19:
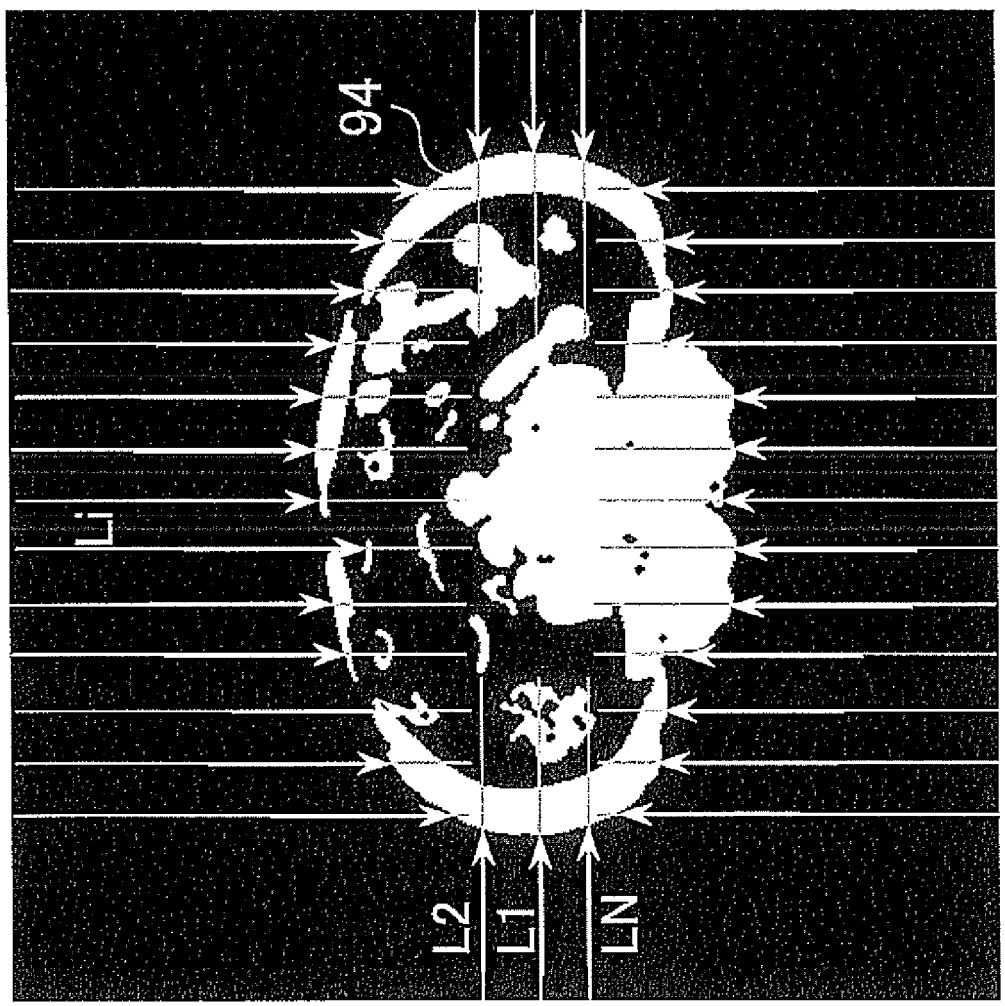
FIG. 19 is a diagram showing an example in which bone-muscle region boundary points are searched on a bone-muscle region mask along a plurality of straight lines respectively extending in forward and backward directions of a subject and in a horizontal direction thereof.

Although the bone-muscle region outer peripheral profile line creating unit 14 searches the boundary points along the plurality of straight lines L1, L2, ..., LN extending radially in all directions through the point G corresponding to the gravity center of the body region mask 52 at the bone-muscle region mask 54 in the above embodiment, the bone-muscle region outer peripheral profile line creating unit 14 may search boundary points along a plurality of straight lines L1', L2', ... LN' respectively extending in parallel in forward and backward directions of a subject and in its horizontal direction as shown in FIG. 19 by way of example except for the above. Thus, when the position to be searched is moved or shifted, the calculation of its position coordinates becomes simpler and the amount of calculation can be reduced, thereby making it possible to shorten processing time.

Many widely different embodiments of the invention may be configured without departing from the spirit and the scope of the present invention. It should be understood that the present invention is not limited to the specific embodiments described in the specification, except as defined in the appended claim.

What is claimed is:

1. An image processing method comprising:
   identifying a body region of a subject in a tomographic image based on pixel values of pixels constituting the tomographic image;
   extracting a bone muscle region corresponding to essential parts of bones and muscles based on bone muscle pixels having pixel values corresponding to one of the bones and the muscles in the body region;
   searching boundary points of the bone muscle region from outside a region surrounding the extracted bone muscle region to inside the region;
   creating a bone-muscle region outer peripheral profile line by joining only boundary points at which each index related to at least one of a length and a slope of a line segment connecting between adjoining boundary points of the searched boundary points satisfies a predetermined condition; and
   extracting a visceral fat region that includes fat pixels having pixel values corresponding to fat in a region lying inside the bone-muscle region outer peripheral profile line.

2. The image processing method according to claim 1, wherein creating the bone-muscle region outer peripheral profile line comprises sequentially setting individual boundary points to noted boundary points, and when each of the noted boundary points is located near the front of the subject from a gravity center of the body region, only the noted boundary point at which a ratio between a distance from the gravity center to a boundary point adjacent to the noted boundary point and a distance from the gravity center to the noted boundary point falls within a predetermined first range, is left, and when each of the noted boundary points is located near a back side of the subject from the gravity center, only the noted boundary point at which a distance between the noted boundary point and a boundary point adjacent thereto falls within a predetermined second range, is left, and all remaining boundary points are joined together.

3. An image processing apparatus comprising:
   a body region identifying device configured to identify a body region of a subject in a tomographic image based on pixel values of pixels that constitute the tomographic image;
   a bone-muscle region extracting device configured to extract a bone muscle region corresponding to essential parts of bones and muscles based on bone muscle pixels having pixel values corresponding to one of the bones and the muscles in the body region;
   a bone-muscle region outer peripheral profile line creating device configured to search boundary points of the bone muscle region from outside a region surrounding the extracted bone muscle region to inside the region and to create a bone-muscle region outer peripheral profile line by joining only boundary points at which each index related to at least one of a length and a slope of a line segment connecting between adjoining boundary points of the searched boundary points satisfies a predetermined condition; and a visceral fat region extracting device configured to extract a visceral fat region that includes fat pixels having pixel values corresponding to fat in a region lying inside the bone-muscle region outer peripheral profile line.

4. The image processing apparatus according to claim 3, wherein said bone-muscle region outer peripheral profile line creating device is configured to set individual boundary points to noted boundary points sequentially and leaves only each noted boundary point at which a ratio between a distance from a gravity center of the body region to a boundary point adjacent to the noted boundary point and a distance from the gravity center to the noted boundary point falls within a predetermined range, and to join the remaining boundary points together.

5. The image processing apparatus according to claim 3, wherein said bone-muscle region outer peripheral profile line creating device is configured to set individual boundary points to noted boundary points sequentially and leaves only each noted boundary point at which a distance between the noted boundary point and a boundary point adjacent thereto falls within a predetermined range, and to join the remaining boundary points together.

6. The image processing apparatus according to claim 3, wherein said bone-muscle region outer peripheral profile line creating device is configured to set individual boundary points to noted boundary points sequentially, wherein when each of the noted boundary points is located near a front of the subject from a gravity center of the body region, said bone-muscle region outer peripheral profile line creating device leaves only the noted boundary point at which a ratio between a distance from the gravity center to a boundary point adjacent to the noted boundary point and a distance from the gravity center to the noted boundary point falls within a predetermined first range, and wherein when each of the noted boundary points is located near a back side of the subject from the gravity center, said bone-muscle region outer peripheral profile line creating device leaves only the noted boundary point at which a distance between the noted boundary point and a boundary point adjacent thereto falls within a predetermined second range, and to join all remaining boundary points together.

7. The image processing apparatus according to claim 6, wherein the first range ranges from greater than or equal to 0.8 to less than or equal to 1.2.

8. The image processing apparatus according to claim 6, wherein the second range is a range equivalent to one of less than or equal to any length of 2% to 10% of an average inside diameter of an ellipse at a time that the body region is made approximate to the ellipse, and an average of a minor-axis diameter of the ellipse and a major-axis diameter.

9. The image processing apparatus according to claim 3, further comprising:
a full fat region extracting device configured to extract a full fat region obtained by subtracting the bone muscle region from the region including the fat pixels in the body region; and
a subcutaneous fat region extracting device configured to extract a subcutaneous fat region obtained by subtracting the visceral fat region from the full fat region.

10. The image processing apparatus according to claim 3, wherein said bone-muscle region extracting device is configured to perform contracting processing and expanding processing on each candidate region that includes the bone muscle pixels in the body region sequentially to extract a bone muscle region.

11. The image processing apparatus according to claim 3, wherein the contracting processing is an erosion process and the expanding processing is a dilation process.

12. The image processing apparatus according to claim 3, further comprising a threshold setting device configured to create a histogram of pixel values of the tomographic image and to set a fat threshold range indicative of a threshold range of pixel values corresponding to fat and a bone-muscle threshold range indicative of a threshold range of pixel values corresponding to the bones or the muscles based on the histogram, wherein said bone-muscle region extracting device is configured to extract the bone muscle region based on the bone-muscle threshold range, and wherein said visceral fat region extracting device is configured to extract the visceral fat region based on the fat threshold range.

13. The image processing apparatus according to claim 12, wherein said threshold setting device is configured to set the fat threshold range to P±nΔ assuming that a peak value of a mountain corresponding to fat in the histogram is P and a full width half maximum of the mountain is Δ, and to set the bone-muscle threshold range to a predetermined range in which the neighborhood of P+nΔ is brought to a lower limit value, where n is an arbitrary constant.

14. The image processing apparatus according to claim 3, wherein said bone-muscle region outer peripheral profile line creating device is configured to search the boundary points along a plurality of straight lines extending radially in all directions.

15. The image processing apparatus according to claim 14, wherein the plurality of straight lines are straight lines that pass through one of a gravity center of the body region, a center of a quadrangle circumscribed around the body region, a gravity center of the bone muscle region, and a center of a quadrangle circumscribed around the bone muscle region.

16. The image processing apparatus according to claim 14, wherein the plurality of straight lines are straight lines provided in increments of a predetermined angle ranging from greater than or equal to 1° to less than or equal to 5°.

17. The image processing apparatus according to claim 3, wherein said bone-muscle region outer peripheral profile line creating device is configured to search the boundary points along a plurality of straight lines respectively extending in parallel in forward and backward directions of the subject and in a horizontal direction.

18. The image processing apparatus according to claim 3, wherein the tomographic image is one of a CT image and an MRI image.

19. A non-transitory computer readable medium configured to operate a central processing unit (CPU) of an image processing apparatus to extract a visceral fat region by:
identifying a body region of a subject in a tomographic image based on pixel values of pixels that constitute the tomographic image;
extracting a bone muscle region corresponding to essential parts of bones and muscles based on bone muscle pixels having pixel values corresponding to one of the bones and the muscles in the body region;
searching boundary points of the bone muscle region from outside a region surrounding the extracted bone muscle region to inside the region;
creating a bone-muscle region outer peripheral profile line by joining only boundary points at which each index related to at least one of a length and a slope of a line segment connecting between the adjoining boundary points of the searched boundary points satisfies a predetermined condition; and extracting the visceral fat region that includes fat pixels having pixel values corresponding to fat in a region lying inside the bone-muscle region outer peripheral profile line.

20. The computer-readable medium according to claim 19, wherein the program further operates the CPU by setting individual boundary points to noted boundary points sequentially, wherein when each of the noted boundary points is located near a front of the subject from a gravity center of the body region, only the noted boundary point at which a ratio between a distance from the gravity center to a boundary point adjacent to the noted boundary point and a distance from the gravity center to the noted boundary point falls within a predetermined first range is left, and wherein when each of the noted boundary points is located near a back side of the subject from the gravity center, only the noted boundary point at which a distance between the noted boundary point and a boundary point adjacent thereto falls within a predetermined second range is left, and by joining all remaining boundary points together.

* * * * *